United States Patent [19]
Kojima

[11] Patent Number: 5,838,594
[45] Date of Patent: Nov. 17, 1998

[54] METHOD AND APPARATUS FOR GENERATING FINITE ELEMENT MESHES, AND ANALYZING METHOD AND APPARATUS

[75] Inventor: Shuichi Kojima, Kawasaki, Japan

[73] Assignee: Fujitsu Limited, Kawasaki, Japan

[21] Appl. No.: 591,793

[22] Filed: Jan. 25, 1996

[30]     Foreign Application Priority Data

Feb. 24, 1995  [JP]  Japan .................................. 7-037327
Dec. 28, 1995  [JP]  Japan .................................. 7-343930

[51] Int. Cl.$^6$ ...................................................... G06F 17/10
[52] U.S. Cl. .......................... 364/578; 364/488; 364/489
[58] Field of Search .................................. 364/488, 489, 364/490, 491, 578; 395/500, 920, 123

[56]            References Cited

U.S. PATENT DOCUMENTS

| | | | |
|---|---|---|---|
| 4,912,664 | 3/1990 | Weiss et al. ............................. | 395/141 |
| 4,933,889 | 6/1990 | Meshkat et al. ......................... | 364/578 |
| 4,941,114 | 7/1990 | Shigyo et al. ........................... | 395/123 |
| 5,214,752 | 5/1993 | Meshkat et al. ......................... | 395/123 |
| 5,315,537 | 5/1994 | Blacker .................................. | 364/578 |
| 5,442,569 | 8/1995 | Osano .................................... | 364/578 |
| 5,553,009 | 9/1996 | Meshkat et al. ......................... | 364/578 |
| 5,553,206 | 9/1996 | Meshkat .................................. | 395/123 |
| 5,579,249 | 11/1996 | Edwards ................................. | 364/578 |
| 5,617,322 | 4/1997 | Yokota ................................... | 364/578 |

FOREIGN PATENT DOCUMENTS 63-238665  10/1988  Japan .

OTHER PUBLICATIONS

Yuan et al., "A Mesh Generator for Tetrahedral Elements Using Delaunay Triangulation".

Kumashiro et al., "A Triangular Mesh Generation Method Suitable for the Analysis of Complex MOS Device Structures".

Tanimoto et al., "Discretization Error in MOSFET Device Simulation".

Ciampolini et al, "Efficient 3–D Simulation of Complex Structures".

Shigyo et al., "Trimedes: A Triangular Mesh Device Simulator Linked w/ Topography/Process Simulation".

Machek et al., "A Novel Finite–Element Approach to Device Modelling".

Kojima et al., "Duel Mesh Approach for Semiconductor Device Simulator".

Chon et al., "Tangential Vector Finite Elements for Semiconductor Device Simulation".

Primary Examiner—Kevin J. Teska
Assistant Examiner—Tyrone V. Walker
Attorney, Agent, or Firm—Staas & Halsey

[57]            ABSTRACT

A finite element mesh generating method generates triangular meshes used in finite element method analysis. This finite element mesh generating method includes the steps of (a) inputting orthogonal meshes used in finite difference method and mesh joining conditions, (b) setting flags indicating candidates of lattice points which are to be deleted out of lattice points of the orthogonal meshes, based on the orthogonal meshes, (c) reducing a number of meshes by joining the lattice points having the set flag and lattice points adjacent thereto, based on the mesh joining conditions, and (d) successively generating triangular meshes by searching nodes formed by lattice points remaining on the meshes after joining the lattice points and generating oblique sides of rectangles which are formed by connecting the nodes.

39 Claims, 29 Drawing Sheets

FIG. 25A
FIG. 25B
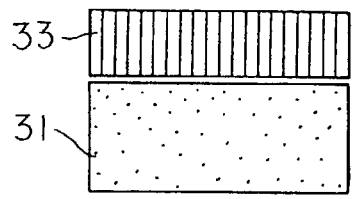
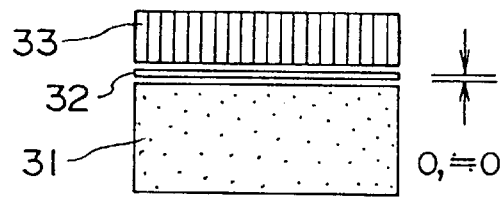
FIG. 26A
FIG. 26B
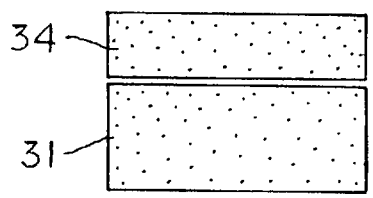
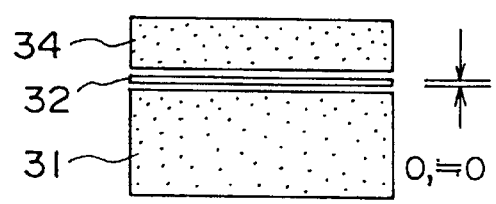
FIG. 27A
FIG. 27B
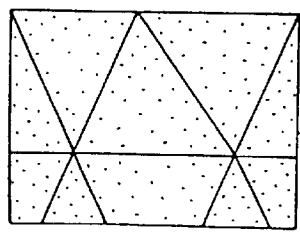
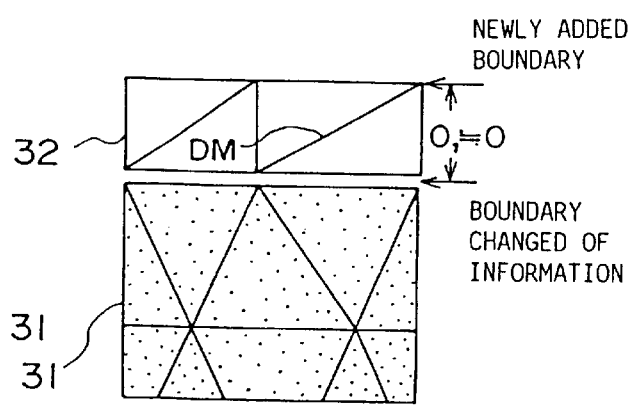

FIG. 28A
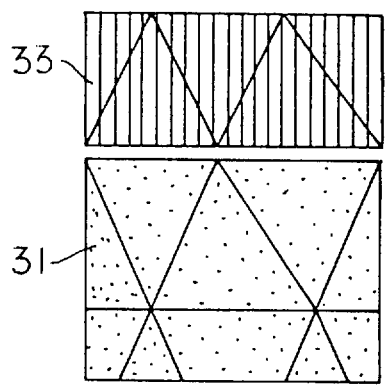
FIG. 28B
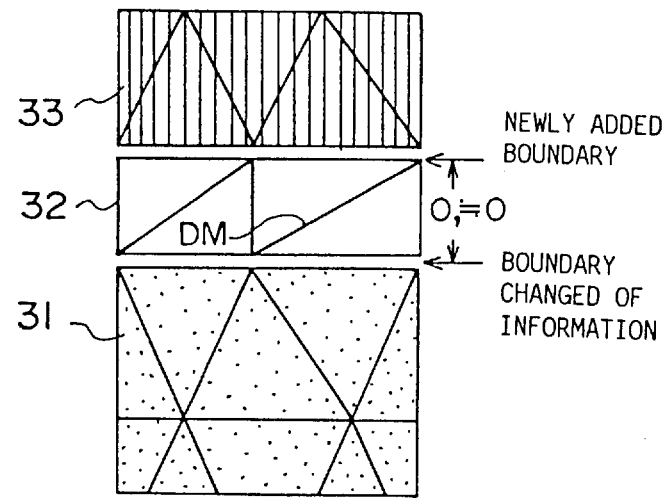
FIG. 29A
FIG. 29B
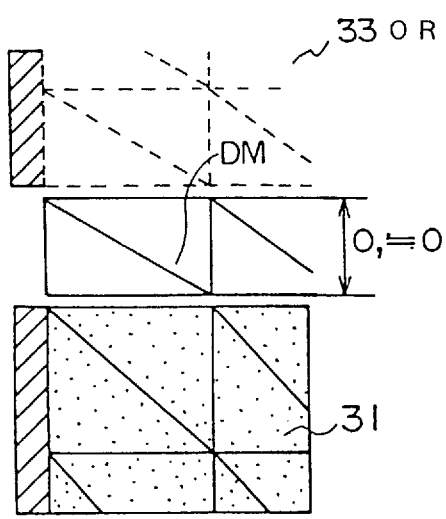
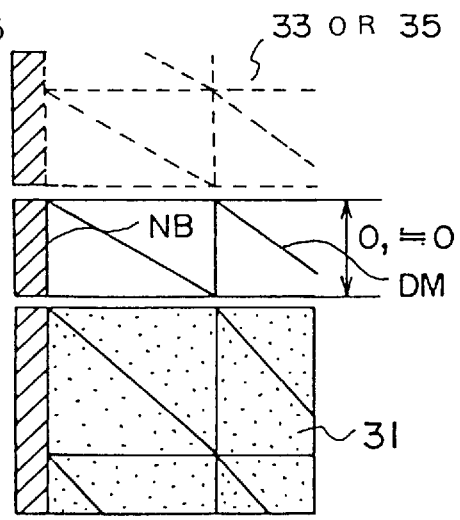

FIG. 39

| MATERIALS ON BOTH SIDES | MATERIAL A | MATERIAL B | MATERIAL C | MATERIAL D | MATERIAL E |
|---|---|---|---|---|---|
| MATERIAL A |  | MATERIAL C | --- | MATERIAL C | --- |
| MATERIAL B | MATERIAL C |  | --- | --- | --- |
| MATERIAL C | --- | --- |  | --- | --- |
| MATERIAL D | MATERIAL C | MATERIAL C | --- |  | --- |
| MATERIAL E | --- | --- | --- | --- |  |

FIG. 40

| MATERIALS ON BOTH SIDES | MATERIAL A | MATERIAL B | MATERIAL C | MATERIAL D | MATERIAL E |
|---|---|---|---|---|---|
| GROWING MATERIAL | MATERIAL C | MATERIAL C | - - - | MATERIAL E | - - - |

FIG. 41

| MATERIALS ON BOTH SIDES | MATERIAL A | MATERIAL B | MATERIAL C | MATERIAL D | MATERIAL E |
|---|---|---|---|---|---|
| ANALYZING BOUNDARY | | | | | |
| AIR | — | — | — | — | — |
| MATERIAL A | MATERIAL C | — | — | MATERIAL E | — |
| MATERIAL B | MATERIAL C | MATERIAL C | — | MATERIAL C | — |
| MATERIAL C | MATERIAL C | — | — | MATERIAL C | — |
| MATERIAL D | — | MATERIAL C | — | — | — |
| MATERIAL E | — | — | — | — | — |

FIG. 44

| MATERIALS ON BOTH SIDES | MATERIAL A | MATERIAL B | MATERIAL C | MATERIAL D | MATERIAL E |
|---|---|---|---|---|---|
| ANALYZING BOUNDARY | | | | | |
| AIR | --- | --- | --- | --- | --- |
| MATERIAL A | MATERIAL C | MATERIAL C | --- | MATERIAL E | --- |
| MATERIAL B | MATERIAL C | MATERIAL C | --- | MATERIAL C | --- |
| MATERIAL C | --- | --- | --- | MATERIAL C | --- |
| MATERIAL D | MATERIAL C | MATERIAL C | --- | MATERIAL E | --- |
| MATERIAL E | --- | --- | --- | --- | --- |

FIG. 47B
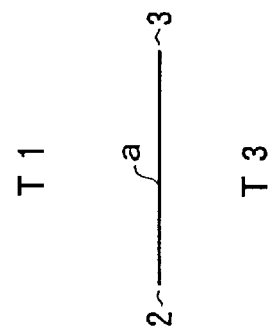
FIG. 47A
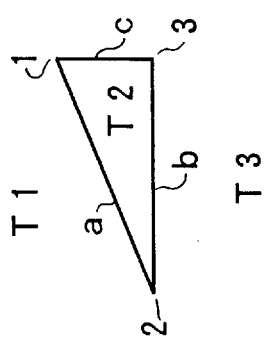
FIG. 48B
| SIDE NUMBER | NODE | TRIANGLES ON BOTH SIDES | |
|---|---|---|---|
| a | 2 3 | T 1 | T 3 |
FIG. 48A
| SIDE NUMBER | NODE | TRIANGLES ON BOTH SIDES | |
|---|---|---|---|
| a | 1 2 | T 1 | T 2 |
| b | 2 3 | T 2 | T 3 |

METHOD AND APPARATUS FOR GENERATING FINITE ELEMENT MESHES, AND ANALYZING METHOD AND APPARATUS

BACKGROUND OF THE INVENTION

The present invention generally relates to methods and apparatuses for generating finite element meshes and analyzing methods and apparatuses, and more particularly to a method and an apparatus for generating finite element meshes suited for a finite element method analysis using triangles, and to an analyzing method and an analyzing apparatus which are suited for analyzing semiconductor device production processes using triangular meshes.

In technical fields such as simulation of processes used to produce semiconductor devices where a large scale numerical analysis is required, the finite element method analysis using triangles is more advantageous compared to the general finite difference method analysis using rectangles, because the finite element method analysis can follow the shape in a satisfactory manner and a high precision analysis is possible. On the other hand, the shape data is complex in the case of the finite element method analysis using triangles, and there are demands to realize a method of simply forming the shape data, that is, triangular mesh data, and to realize a method of simply forming mesh data suited for calculation because the calculation time is dependent on the shape of the triangles. In addition, since the memory capacity that is available for the data processing is limited by the data processing apparatus, there is also a demand to eliminate unwanted or unnecessary data.

As a first example of the prior art, there is a method of forming triangular meshes as proposed in a Japanese Laid-Open Patent Application No.63-238665. According to this first prior art, the entire space to be subject to the processing is divided by a mesh length (side length) that becomes a reference, so as to obtain initial data of a polygon. The initial data of the polygon are successively divided in a sequence starting from the portion with the largest angle, and are registered as data of the triangles. As a result, the triangular meshes shown in FIG. 1, for example, are obtained. It is possible to carry out a smoothing process as a postprocess, by moving nodes to centers of gravity of polygons formed by all of the triangles including the nodes.

As a second example of the prior art, there is a proposed method which makes the meshes finer at portions where it is necessary to do so. In other words, the successive divisions of the meshes are repeated only at the portions where it is necessary to do so, as shown in FIG. 2, so as to obtain the meshes with the required precision.

On the other hand, it is conceivable to form triangular meshes by adding oblique sides to the orthogonal meshes which are obtained by the finite difference method, as shown in FIG. 3.

According to the first prior art, uniform meshes are formed as a whole. For this reason, if it is necessary to make the meshes finer at a certain portion, it is necessary to make the meshes of the entire space finer or, to divide the space into meshes by changing the mesh length that is used as a reference depending on the position in the space. However, in the first case, the number of meshes becomes considerably large, and there is a problem in that the analyzing time and the memory capacity used both increase. On the other hand, in the latter case, it is difficult to specify the mesh length when changing the mesh length, and there is a problem in that undesirable meshes that are undesirable from the point of view of analysis are generated at joints of portions with different mesh lengths. The undesirable meshes refer to meshes of an obtuse angled triangle and meshes of triangles which are extremely small compared to the adjacent or neighboring triangles. In addition, in the latter case, it is possible to correct the undesirable meshes to a certain extent by carrying out a smoothing process, however, it is impossible to completely eliminate such undesirable meshes.

According to the second prior art, it is more convenient than the first prior art in that the meshes can easily be made finer only at the required portions. However, since the meshes are successively divided at the required portions, if one of the two mutually adjacent triangular meshes is a divided triangular mesh and the other is a triangular mesh that is not divided, the ratio of the areas of these two mutually adjacent triangular meshes becomes two times or more. For this reason, in order to avoid the successive division of the meshes from affecting the portions where the analysis is to be made in the second prior art, it is necessary to make the portions where the meshes are finely divided as large as possible. As a result, according to the second prior art, there are problems in that the number of meshes becomes large, the analyzing time becomes long, and the required memory capacity becomes large.

On the other hand, according to the conceivable method described above, it is possible to utilize the orthogonal meshes of the finite difference method which makes a similar analysis. Hence, when specifying the division of the meshes, it is simply necessary to specify the direction of the oblique side in addition to the specifying the same elements as in the case of the orthogonal meshes of the finite difference method. In addition, compared to the first prior art which divides the entire space into the fine meshes, the number of meshes becomes smaller in the conceivable method. In addition, in the conceivable method, the areas of the mutually adjacent triangular meshes will not be greatly different as in the case of the second prior art. For these reasons, the conceivable method can form meshes which are more appropriate for the analysis as compared to the first prior art and the second prior art.

However, as may be seen from FIG. 3, elongated triangular meshes which are unnecessary for the analysis are generated in the peripheral portions of the space. Hence, compared to the finite difference method, additional calculations and additional memory regions used for the shape information become necessary because the calculation technique employed in the conceivable method is different from that employed by the finite difference method. Therefore, there is a problem in that even if the number of meshes is a maximum that may be calculated by the finite difference method, the calculation is impossible according to the finite element method.

On the other hand, in the case of an analyzing process which treats materials to be grown, such as when analyzing an oxidation process of the semiconductor device production method, it was impossible to make the analysis using the generated meshes if the material to be newly grown originally does not exist.

SUMMARY OF THE INVENTION

Accordingly, it is a general object of the present invention to provide a novel and useful method and apparatus for generating finite element meshes, in which the problems described above are eliminated.

Another and more specific object of the present invention is to provide a method and apparatus for generating finite element meshes, wherein the memory capacity required for the calculation and the like is reduced so that the calculation time is greatly reduced when making the finite element method analysis using triangles.

Another more specific object of the present invention is to provide an analyzing method and an analyzing apparatus which can automatically add a material which is necessary for the growth when analyzing the growing process of this material.

Still another object of the present invention is to provide a finite element mesh generating method which is implemented on a computer and generates triangular meshes used in finite element method analysis, comprising the steps of (a) inputting orthogonal meshes used in finite difference method and mesh joining conditions, (b) setting flags indicating candidates of lattice points which are to be deleted out of lattice points of the orthogonal meshes, based on the orthogonal meshes, (c) reducing a number of meshes by joining the lattice points having the set flag and lattice points adjacent thereto, based on the mesh joining conditions, and (d) successively generating triangular meshes by searching nodes formed by lattice points remaining on the meshes after joining the lattice points and generating oblique sides of rectangles which are formed by connecting the nodes. According to the finite element mesh generating method of the present invention, it is possible to generate the triangular meshes by deleting and joining unwanted lattice points with adjacent lattice points based on the orthogonal meshes which are used in the finite difference method and reducing the number of nodes. In addition, it is possible to utilize the orthogonal data used in the finite difference method as data which forms the basis of the initial mesh, and the mesh portion to be made finer can be specified with ease regardless of whether it is made by the input from the user or is generated automatically. The orthogonal meshes used in the finite difference method are normally formed so that the meshes are fine at portions which are required for the analysis and so that no sudden changes exist. As a result, these characteristics of the orthogonal meshes are reflected to the triangles which are generated, and it is possible to generate optimum triangular meshes which are suited for the finite element method analysis. On the other hand, by the reduced number of nodes, it becomes possible to reduce the memory capacity that is required for the calculation during a simulation process. Furthermore, since it is possible to generate triangles having the shapes suited for the finite element method analysis, results of iterative or repetitive calculations satisfactorily converge, thereby making it possible to considerably reduce the calculation time.

A further object of the present invention is to provide a finite element mesh generating method described above and further comprising the steps of (d) adding, with respect to a portion where a growing material is introduced, dummy meshes corresponding to a thin film of the growing material having a thickness which is zero or an extremely small thickness compared to other analyzing portions prior to making an analyzing process with respect to the growing material using the triangular meshes. According to the finite element mesh generating method of the present invention, it is possible to automatically add the material which is required for the growth of the material when analyzing a growing process of the material.

Another object of the present invention is to provide a finite element mesh generating apparatus which is implemented on a computer and generates triangular meshes used in finite element apparatus analysis, comprising means for inputting orthogonal meshes used in difference apparatus and mesh joining conditions, setting means for setting flags indicating candidates of lattice points which are to be deleted out of lattice points of the orthogonal meshes, based on the orthogonal meshes, means for reducing a number of meshes by joining the lattice points having the set flag and lattice points adjacent thereto, based on the mesh joining conditions, and generating means for successively generating triangular meshes by searching nodes formed by lattice points remaining on the meshes after joining the lattice points and generating oblique sides of rectangles which are formed by connecting the nodes. According to the finite element mesh generating apparatus of the present invention, it is possible to generate the triangular meshes by deleting and joining unwanted lattice points with adjacent lattice points based on the orthogonal meshes which are used in the finite difference method and reducing the number of nodes. In addition, it is possible to utilize the orthogonal data used in the finite difference method as data which forms the basis of the initial mesh, and the mesh portion to be made finer can be specified with ease regardless of whether it is made by the input from the user or is generated automatically. The orthogonal meshes used in the finite difference method are normally formed so that the meshes are fine at portions which are required for the analysis and so that no sudden changes exist. As a result, these characteristics of the orthogonal meshes are reflected to the triangles which are generated, and it is possible to generate optimum triangular meshes which are suited for the finite element method analysis. On the other hand, by the reduced number of nodes, it becomes possible to reduce the memory capacity that is required for the calculation during a simulation process. Furthermore, since it is possible to generate triangles having the shapes suited for the finite element method analysis, results of iterative or repetitive calculations satisfactorily converge, thereby making it possible to considerably reduce the calculation time.

Still another object of the present invention is to provide a finite element mesh generating apparatus described above and further comprising means for adding, with respect to a portion where a growing material is introduced, dummy meshes corresponding to a thin film of the growing material having a thickness which is zero or an extremely small thickness compared to other analyzing portions prior to making an analyzing process with respect to the growing material using the triangular meshes. According to the finite element mesh generating apparatus of the present invention, it is possible to automatically add the material which is required for the growth of the material when analyzing a growing process of the material.

Another object of the present invention is to provide an analyzing method which is implemented on a computer and analyzes moving boundaries and changing shapes by use of meshes corresponding to materials, comprising the steps of (a) generating meshes corresponding to a first material on which a second material is grown, and (b) adding, with respect to a portion where the second material is introduced, dummy meshes corresponding to a thin film of the second material having a thickness which is zero or an extremely small thickness compared to other analyzing portions prior to making an analyzing process with respect to the second material using the meshes. According to the analyzing method of the present invention, it is possible to automatically add the material which is required for the growth of the material when analyzing a growing process of the material, and various kinds of growing processes can be analyzed without the need for a skilled operator.

Still another object of the present invention is to provide an analyzing apparatus which is implemented on a computer and analyzes moving boundaries and changing shapes by use of meshes corresponding to materials, comprising first means for generating meshes corresponding to a first material on which a second material is grown, storage means for storing the meshes, and second means for adding, with respect to a portion where the second material is introduced, dummy meshes corresponding to a thin film of the second material having a thickness which is zero or an extremely small thickness compared to other analyzing portions prior to making an analyzing process with respect to the second material using the meshes. According to the analyzing apparatus of the present invention, it is possible to automatically add the material which is required for the growth of the material when analyzing a growing process of the material, and various kinds of growing processes can be analyzed without the need for a skilled operator.

Other objects and further features of the present invention will be apparent from the following detailed description when read in conjunction with the accompanying drawings.

BRIEF DESCRIPTION OF THE DRAWINGS

FIGS. 25A and 25B respectively are cross sectional views for explaining analysis of a process which carries out oxidation after forming a layer on the substrate in the embodiment of the analyzing method;

FIGS. 26A and 26B respectively are cross sectional views for explaining analysis of a process which removes a layer after the layer is formed on the substrate in the embodiment of the analyzing method;

FIGS. 27A and 27B respectively are cross sectional views for explaining analysis of a process which forms a layer on a substrate surface by oxidizing the substrate;

FIGS. 28A and 28B respectively are cross sectional views for explaining analysis of a process which forms a layer at a boundary portion of 2 adjacent layers by carrying out a thermal process with respect to a multi-layer structure;

FIGS. 29A and 29B respectively are cross sectional views for explaining a processing of analyzing boundaries of dummy meshes;

FIG. 39 is a diagram showing contents of a table which specifies materials to be grown on the material boundary;

FIG. 40 is a diagram showing contents of a table which specifies the material to be grown on the surface;

FIG. 41 is a diagram showing contents of a table which is used in place of the tables shown in FIGS. 39 and 40;

FIG. 44 is a diagram showing contents of a table which sets the materials even with respect to portions where the same material intersect;

FIGS. 47A and 47B respectively are diagrams showing meshes for explaining a process of deleting the dummy meshes;

FIGS. 48A and 48B respectively are diagrams showing contents of a table for explaining the process of deleting the dummy meshes;

DESCRIPTION OF THE PREFERRED EMBODIMENTS

Figure 4:
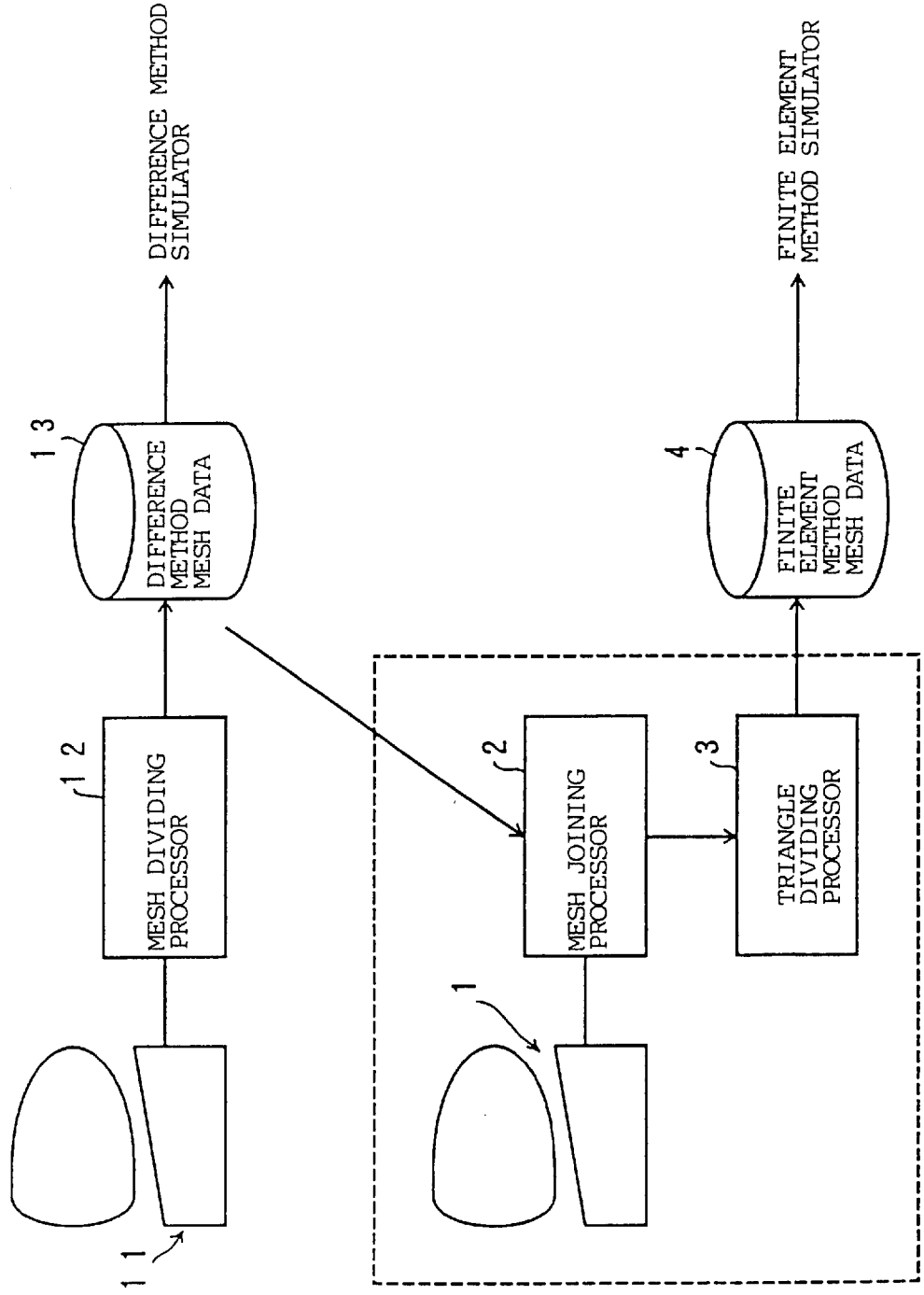
FIG. 4 is a system block diagram showing an embodiment of a finite element mesh generating apparatus according to the present invention.

FIG. 4 shows an embodiment of a finite element mesh generating apparatus according to the present invention. In FIG. 4, the finite element mesh generating apparatus includes an input unit 1, a mesh joining processor 2 and a triangle dividing processor 3 as surrounded by the dotted line.

The mesh joining processor 2 carries out a mesh joining process based on mesh joining conditions input from the input unit 1 and finite difference method mesh data read and input from a storage unit 13. The mesh joining process deletes unwanted or unnecessary lattice points and joins the unwanted lattice points with other lattice points based on orthogonal meshes for the finite difference method simulator, so as to reduce the number of nodes. The finite difference method mesh data read from the storage unit 13 are stored in the storage unit 13 by a mesh dividing processor 12 which carries out a mesh dividing process based on mesh dividing conditions input from the input unit 11.

The triangle dividing processor 3 carries out a triangle dividing process based on results of the mesh joining process carried out by the mesh joining processor 2, a results of this triangle dividing process are stored as finite element method mesh data in a storage unit 4. The triangle dividing process generates triangles by connecting appropriate nodes based on information related to the nodes which are reduced by the mesh joining process described above.

Accordingly, it is possible to carry out the finite difference method simulation based on the finite difference method data stored in the storage unit 13, and it is possible to carry out a finite element method simulation based on the finite element method mesh data stored in the storage unit 4.

The mesh joining processor 2 can be formed by hardware which is made up of a known processor and memory combination (that is, a computer), so that the mesh joining process can be realized by software by executing programs stored in the memory by the processor. Similarly, the triangle dividing processor 3 can be formed by hardware which is made up of the known processor and memory combination, so that the triangle dividing process can be realized by software by executing programs stored in the memory by the processor. Accordingly, it is possible to realize the functions of the mesh joining processor 2 and the triangle dividing processor 3 by the same processor and memory combination. In addition, the mesh dividing processor 12 can be formed by hardware which is made up of a known processor and memory combination, so that the mesh dividing process can be realized by software by executing programs stored in the memory by the processor. Thus, it is also possible to realize the functions of the mesh joining processor 2, the triangle dividing processor 3 and the mesh dividing processor 12 by the same processor and memory combination.

Further, the triangular meshes which are generated and stored in the storage unit 4 in the form of the mesh data are displayed on a display portion of the input unit 1.

In this embodiment of the finite element mesh generating apparatus, it is possible to utilize the orthogonal data used in the finite difference method as data which forms the basis of the initial mesh, and the mesh portion to be made finer can be specified with ease regardless of whether it is made by the input from the user or is generated automatically. The orthogonal meshes used in the finite difference method are normally formed so that the meshes are fine at portions which are required for the analysis and so that no sudden changes exist. As a result, these characteristics of the orthogonal meshes are reflected to the triangles which are generated, and it is possible to generate optimum triangular meshes which are suited for the finite element method analysis.

Figure 5:
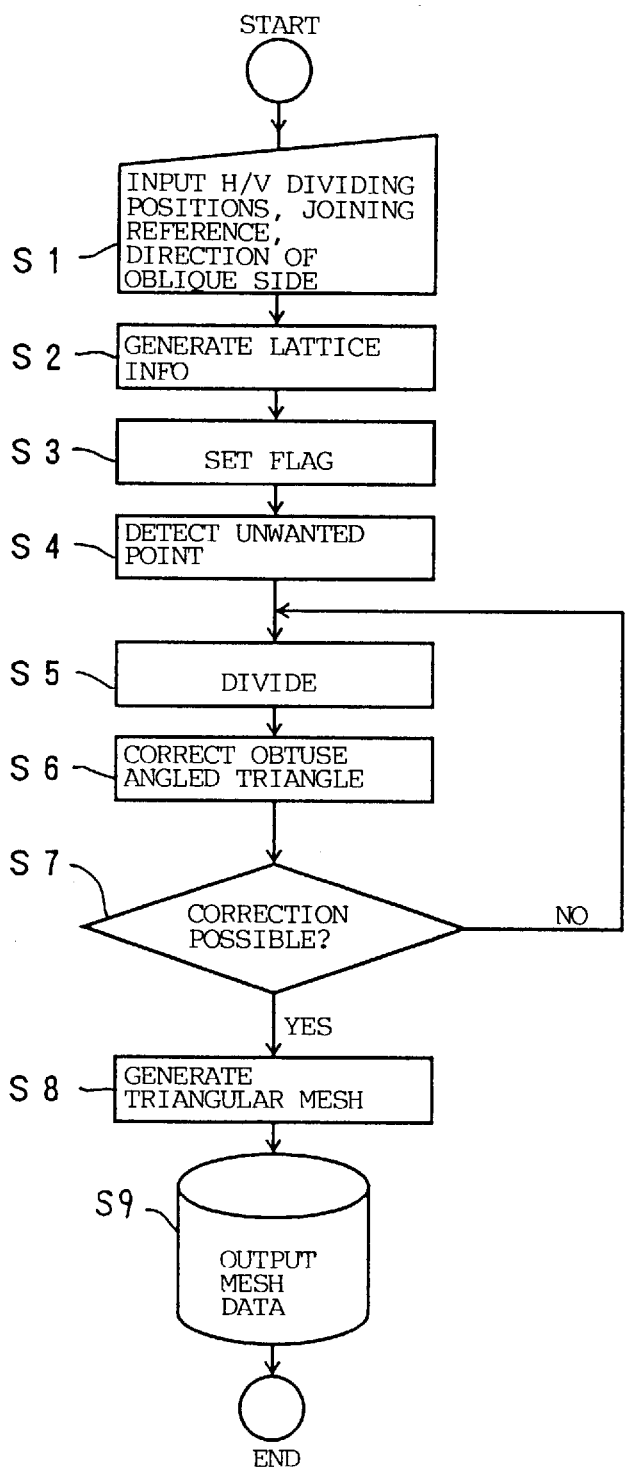
FIG. 5 is a flow chart for explaining the operation of the finite element mesh generating apparatus shown in FIG. 4.

FIG. 5 is a flow chart for explaining the operation of the finite element mesh generating apparatus shown in FIG. 4. In other words, FIG. 5 is a flow chart showing an embodiment of a finite element mesh generating method according to the present invention.

In FIG. 5, a step S1 inputs input information in the mesh joining processor 2. This input formation includes first information which is related to dividing positions of a space that includes an analyzing range for forming lattices of the orthogonal meshes, second information which is related to a reference of a length-to-breadth (or vertical length versus horizontal length) ratio of an unwanted rectangle which is to be deleted, and third information which is related to a direction of an oblique side when dividing the rectangle. The first information is included in the finite difference method mesh data read out from the storage unit 13 shown in FIG. 4. On the other hand, the second information and the third information are included in the mesh joining conditions input from the input unit 1.

Figure 6:
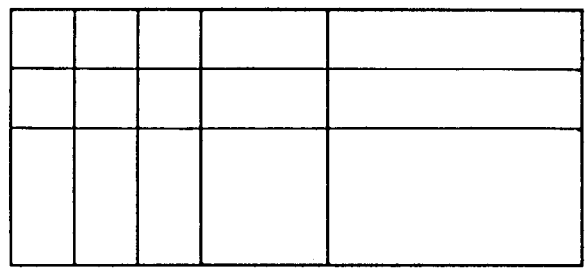
FIG. 6 is a diagram schematically showing lattice information which is generated based on input information.

Next, steps S2 through S5 form node data in the mesh joining processor 2, where the node data form the basis when generating the triangular meshes. The step S2 generates the lattice information which is schematically shown in FIG. 6, for example, based on the input information. The lattice information generated in the step S2 corresponds to the orthogonal mesh data for the finite difference method simulator. The step S3 prepares a number of flags for storing states of the lattice points within the lattice information, and this number of flags amounts to at least the number of the lattice points. The step S3 also initializes the flags by setting those flags in portions having the lattice points. The flags for storing the states of the lattice points are used to store information related to the existence of the mesh, a direction in which an unwanted lattice point is to be deleted, re-division of the lattice, moving of the lattice point and the like.

Figure 7:
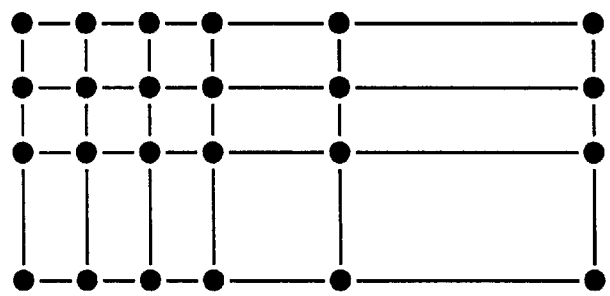
FIG. 7 is a diagram schematically showing a case where flags are provided with respect to lattice points.

FIG. 7 is a diagram schematically showing a case where the flags are prepared with respect to the lattice points in the step S3. In FIG. 7, black circular marks indicate the positions where the flag indicating the existence of the lattice point is stored in correspondence with the meshes.

Figure 8:
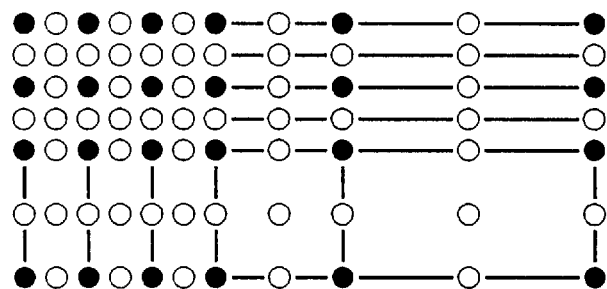
FIG. 8 is a diagram schematically showing a case where flags are provided with respect to lattice points and points which are obtained by dividing lattices.

FIG. 8 is a diagram schematically showing a case where the flags are prepared with respect to the lattice points and the nodes which are obtained by dividing the lattices in the step S3. In FIG. 8, black circular marks indicate the positions where the flag indicating the existence of the lattice point is stored, and white circular marks indicate the positions where the flag indicating non-existence of the lattice point is stored, respectively in correspondence with the meshes.

A step S4 successively detects the unwanted lattice points based on the input information, and sets in the flags the direction in which the unwanted lattice points are to be deleted. The reference that is used to judge the lattice points which are to be deleted by detecting the unwanted lattice points is set as shown in FIG. 9, for example.

Figure 9:
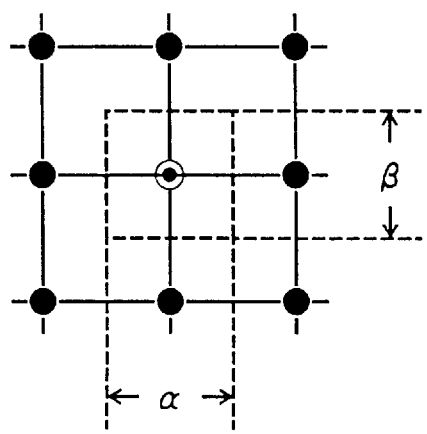
FIG. 9 is a diagram for explaining an embodiment of a reference that is used when judging candidates of lattice points to be deleted.

FIG. 9 is a diagram for explaining an embodiment of the reference that is used to judge the candidates of the lattice points which are to be deleted. In FIG. 9, black circular marks indicate the lattice points, a double circular mark indicates a lattice point that is the focus of attention, and a region surrounded by the dotted line indicates a judging region in which the candidates of the lattice points to be deleted are judged. In addition, $\alpha$ denotes a distance of the judging region in a horizontal direction, and $\beta$ denotes a distance of the judging region in a vertical direction. If a reference value used for the judgement is denoted by A, this embodiment judges that the lattice points within the judging region are candidates of the lattice points to be deleted if a condition $\beta/\alpha > A$ is satisfied when judging the candidates of the lattice points to be deleted in the horizontal direction within the judging region. On the other hand, when judging the candidates of the lattice points to be deleted in the vertical direction within the judging region, this embodiment judges that the lattice points within the judging region are candidates of the lattice points to be deleted if a condition $\alpha/\beta > A$ is satisfied. For example, the reference value A is specified by the user from the input unit 1 together with the mesh joining conditions described above.

Figure 10:
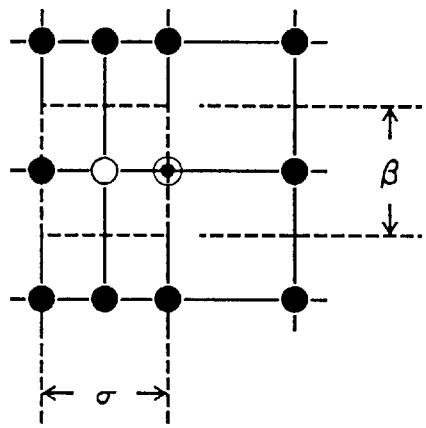
FIG. 10 is a diagram for explaining an embodiment which sets flags related to candidates of lattice points to be deleted.

FIG. 10 is a diagram for explaining an embodiment which sets flags related to the candidates of the lattice points to be deleted. In FIG. 10, black circular marks indicate the lattice points, a white circular mark indicates the lattice point which is the candidate of the lattice point to be deleted, a double circular mark indicates the lattice point which is the focus of attention, and a region surrounded by the dotted line indicates the judging region in which the candidates of the lattice points to be deleted are judged. In addition, $\sigma$ denotes a distance of the judging region in the horizontal direction, and $\beta$ denotes a distance of the judging region in the vertical direction. If the reference value is denoted by A, this embodiment judges that the lattice point indicated by the circular mark within the judging region is the lattice point to be deleted if a condition $\beta/\sigma > A$ is satisfied and sets a flag when judging the candidates of the lattice points to be deleted within the judging region.

Figure 11:
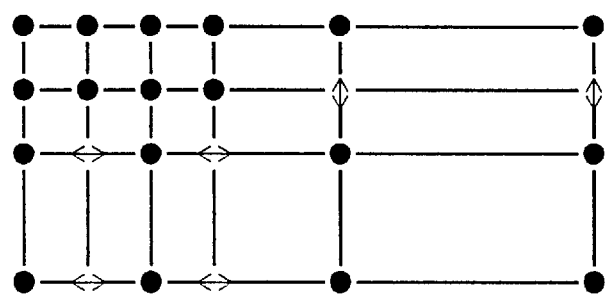
FIG. 11 is a diagram schematically showing flags set under certain conditions.

FIG. 11 is a diagram schematically showing the positions of the flags on the meshes, which flags are set by deleting the unwanted lattice points under certain conditions. In FIG. 11, black circular marks indicate the lattice points, diamond-shaped marks elongated in the vertical direction indicate the positions of the lattice points which are deleted and joined with the lattice points which are adjacent in the vertical direction, and diamond-shaped marks elongated in the horizontal direction indicate the positions of the lattice points which are deleted and joined with the lattice points which are adjacent in the horizontal direction.

Therefore, by deleting the unwanted lattice points under certain conditions and joining the deleted lattice points with the adjacent lattice points, it is possible to reduce the number of lattice points and to reduce the number of meshes.

A step S5 shown in FIG. 5 calculates a number of divisions to be used in order to equally divide the lattices of the orthogonal meshes by an appropriate width with respect to a portion (section) having the flags which are continuously set to indicate the lattices to be deleted, and sets the flags at the positions of each of the lattice points and the nodes which are newly generated by this division. For example, each of the positions on the lattices of the orthogonal meshes are stored in the memory of the processor in the form of a table, and the flags which are set with respect to the lattices and the newly generated nodes are related to this table and are stored in the memory. Accordingly, in the case of a symmetric mesh, the information related to each node is held by the flag of the node, and it is possible to generate a triangular mesh maintaining the symmetry.

Figure 12:
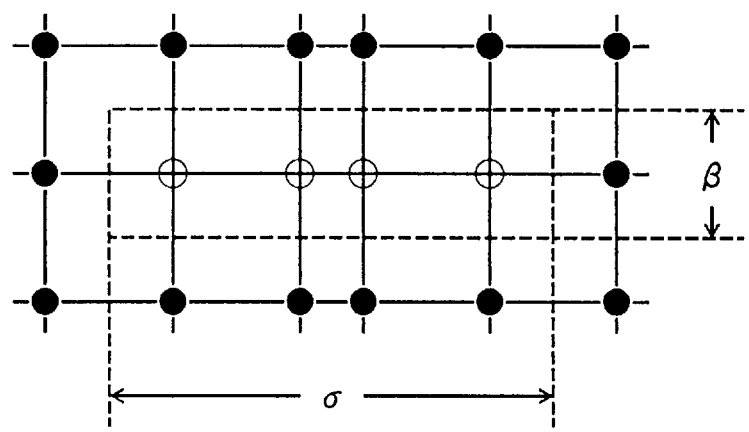
FIG. 12 is a diagram for explaining a number of divisions.

FIG. 12 is a diagram for explaining the number of divisions. In FIG. 12, black circular marks indicate the lattice points, white circular marks indicate the lattice points which are the candidates of the lattice points to be deleted, and a region surrounded by the dotted line indicates the judging region in which the candidates of the lattice points to be deleted are judged. In addition, $\sigma$ denotes a distance of the judging region in the horizontal direction, and $\beta$ denotes a distance of the judging region in the vertical direction. If the reference value is denoted by A, the number of divisions in the horizontal direction is denoted by $\sigma/\beta \cdot A$ in the case shown in FIG. 12.

In order to equally divide the lattices of the orthogonal meshes in the vertical direction by an appropriate width, the number of divisions in the vertical direction is obtained similarly as described above. In this case, when the reference value used for the judgement is denoted by A, the number of divisions in the vertical direction in FIG. 12 can be described by $\beta/\sigma \cdot A$. In addition, the division of the lattices of the orthogonal meshes can of course be made with respect to only one of the horizontal direction and the vertical direction or with respect to both the horizontal and vertical directions.

Figure 13:
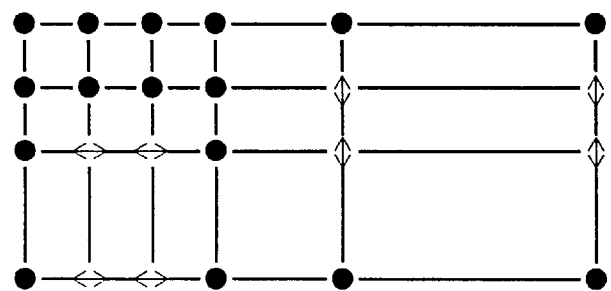
FIG. 13 is a diagram schematically showing flags set by the division.

FIG. 13 is a diagram schematically showing positions of the flags on the meshes, which flags are set by deleting the unwanted lattice points after the division made in the step S5. In FIG. 13, black circular marks indicate the lattice points, diamond-shaped marks elongated in the vertical direction indicate the positions of the lattice points which are deleted and joined with the lattice points which are adjacent in the vertical direction, and diamond-shaped marks elongated in the horizontal direction indicate the positions of the lattice points which are deleted and joined with the lattice points which are adjacent in the horizontal direction.

It is possible to set the flag after making a rearrangement to move the node which is newly generated by the division to the lattice point which is closest to this node. For example, if each of the positions on the lattices of the orthogonal meshes are stored in the memory of the processor in the form of a table, the position of the adjacent lattice point that is used in place of the node which is newly generated by the division and for which adjacent lattice point the flag is set, may be related to this table and stored in the memory. Accordingly, in the case of a symmetric mesh, the information related to the node is held by the flag of the lattice point which is closest to the node, and it is possible to generate a triangular mesh maintaining the symmetry.

Figure 14:
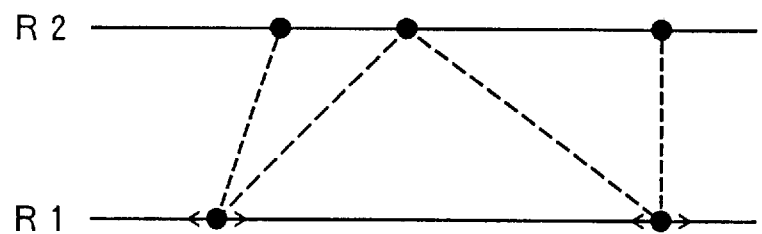
FIG. 14 is a diagram for explaining conditions where an obtuse angled triangle is formed by joining nodes on two mutually adjacent rows.

A step S6 shown in FIG. 5 detects an obtuse angled triangle that is formed by connecting the nodes which are formed by the lattice points remaining after the above described process and corrects the triangle in the mesh joining processor 2 shown in FIG. 4. First, a description will be given of a case where the obtuse angled triangle is detected by comparing two mutually adjacent rows in a sequence starting from those rows having the largest number of nodes. If, between two mutually adjacent rows R1 and R2, two or more nodes of the row R2 having the larger number of nodes exist in the horizontal direction between the nodes of the row R1 having the smaller number of nodes, at least one obtuse angle is generated by connecting the nodes of the row R1 and the nodes of the row R2 as indicated by the dotted line in FIG. 14. In other words, the conditions in which the obtuse angled triangle is generated by connecting the nodes of the two mutually adjacent rows R1 and R2 are that two or more nodes of the row R2 having the larger number of nodes exist in the horizontal direction between the nodes of the row R1 having the smaller number of nodes. In this case, as indicated by the dotted line in FIG. 14, at least one obtuse angled triangle is generated by connecting the nodes of the row R1 and the nodes of the row R2.

If the above described conditions in which the obtuse angled triangle is generated are satisfied, a triangle correction process is carried out. More particularly, if a node or the like having a set flag does not exist in a moving path of a node of the row R1 shown in FIG. 14, for example, and this node of the row R1 is movable, this node of the row R1 is moved to another position and a judgement is made to determine whether or not the above described conditions are satisfied at this other position. For example, if the node of the row R1 is moved to a new position immediately under a node of the row R2 and the above described conditions are not satisfied at this new position, the node of the row R1 is moved to this new position. When making the triangle correction process, it is possible to move a node of the row R2 if this node is movable. In addition, if both the node of the row R1 and the node of the row R2 are movable, the node which requires the shorter moving distance is moved.

Furthermore, if both the node of the row R1 and the node of the row R2 cannot be moved, the decision result of a step S7 shown in FIG. 5 which decides whether or not the triangle correction process can be carried out in the mesh joining processor 2 shown in FIG. 4 becomes NO, and the process returns to the step S5. In this case, a re-division process is carried out after increasing the number of divisions of the lattices of the orthogonal meshes in the horizontal direction, and the process advances to the step S6 which carries out the detection of obtuse angled triangle and the triangle correction process.

Figure 15:
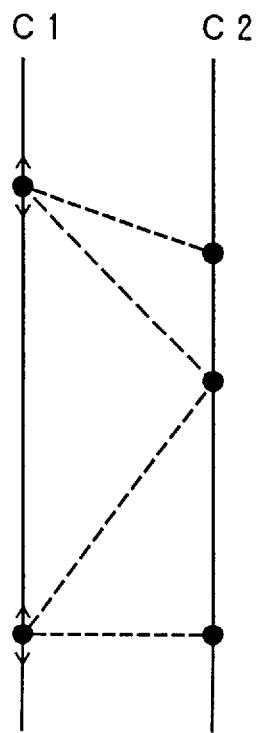
FIG. 15 is a diagram for explaining conditions where an obtuse angled triangle is formed by joining nodes on two mutually adjacent columns.

In the case described above, the nodes are searched in the horizontal direction, and the detection and correction are carried out with respect to the obtuse angled triangle which is obtained by connecting the nodes of the two mutually adjacent rows. However, it is possible to similarly search the nodes in the vertical direction, and carry out the detection and correction with respect to the obtuse angled triangle which is obtained by connecting the nodes of two mutually adjacent columns. In this case, the step S6 shown in FIG. 5 detects an obtuse angled triangle by comparing two mutually adjacent columns in a sequence starting from those columns having the largest number of nodes. If, between two mutually adjacent columns C1 and C2, two or more nodes of the column C2 having the larger number of nodes exist in the vertical direction between the nodes of the column C1 having the smaller number of nodes, at least one obtuse angle is generated by connecting the nodes of the column C1 and the nodes of the column C2 as indicated by the dotted line in FIG. 15. In other words, the conditions in which the obtuse angled triangle is generated by connecting the nodes of the two mutually adjacent columns C1 and C2 are that two or more nodes of the column C2 having the larger number of nodes exist in the vertical direction between the nodes of the column C1 having the smaller number of nodes. In this case, as indicated by the dotted line in FIG. 15, at least one obtuse angled triangle is generated by connecting the nodes of the column C1 and the nodes of the column C2.

If the above described conditions in which the obtuse angled triangle is generated are satisfied, the triangle correction process is carried out. More particularly, if a node or the like having a set flag does not exist in a moving path of a node of the column C1 shown in FIG. 15, for example, and this node of the column C1 is movable, this node of the column C1 is moved to another position and a judgement is made to determine whether or not the above described conditions are satisfied at this other position. For example, if the node of the column C1 is moved to a new position immediately beside a node of the column C2 and the above described conditions are not satisfied at this new position, the node of the column C1 is moved to this new position. When making the triangle correction process, it is possible to move a node of the column C2 if this node is movable. In addition, if both the node of the column C1 and the node of the column C2 are movable, the node which requires the shorter moving distance is moved.

Furthermore, if both the node of the column C1 and the node of the column C2 cannot be moved, the decision result of the step S7 shown in FIG. 5 which decides whether or not the triangle correction process can be carried out in the mesh joining processor 2 shown in FIG. 4 becomes NO, and the process returns to the step S5. In this case, a re-division process is carried out after increasing the number of divisions of the lattices of the orthogonal meshes in the vertical direction, and the process advances to the step S6 which carries out the detection of obtuse angled triangle and the triangle correction process.

Of course, instead of moving the node, it is possible to add a node so as to eliminate the obtuse angled triangle.

When the triangle correction process is carried out and the decision result in the step S7 shown in FIG. 5 becomes YES, a step S8 generates triangular meshes in the triangle dividing processor 3 based on the node data which are generated as described above. In this embodiment, attention is focused on two mutually adjacent rows, and the nodes are searched in the horizontal direction and the oblique sides are formed by successively connecting the nodes in a sequence starting from those nodes which are closest in distance between the two mutually adjacent rows. In addition, triangles are generated by combining the oblique sides and line segments in the horizontal direction. If nodes having the same distance therebetween exist on the two mutually adjacent rows and such nodes are found while searching for the nodes, a rectangle would be generated if such nodes are connected. Hence, in such a case, the rectangle is divided based on the third information which is related to the direction of the oblique side when dividing the rectangle, which third information is included in the input information. In addition, if it is found while searching for the nodes that the flag is set at the lattice point portion which is joined with the lattice point adjacent in the vertical direction and is deleted, the processing with respect to the node at this portion is deferred because this node will be processed when the search is made for the nodes in the vertical direction. After the processing with respect to all of the rows ends, attention is focused on two mutually adjacent columns. Only the lattice point portion having the set flag, which is joined with the lattice point adjacent in the vertical direction and is deleted, is processed similarly as described above. As a result, it is possible to generate triangles which are suited for the finite element method analysis that uses triangles.

In other words, this embodiment prepares a table of the flags which are set by the above described process. Based on this table, the nodes are searched in a sequence from the bottom left to the right in FIG. 8, for example, so as to detect the node having the mesh. If node having the mesh is detected, the search is made using three nodes as starting points, namely, a node above this node having the mesh, a node to the top right of this node having the mesh, and a node to the right of this node having the mesh. That is, the search is made in the upward direction at the node portion which is joined with the lattice point which is adjacent in the vertical direction, the search is made in the rightward direction at the node portion which is joined with the lattice point which is adjacent in the horizontal direction, and such a search is repeated until the node having the mesh is detected. If the line segments connecting the nodes which are detected by the above described search form a rectangle, a triangle is generated by generating a rightwardly inclining oblique side or a leftwardly inclining oblique side specified by the input information. on the other hand, if the line segments connecting the nodes which are detected by the above described search do not form a rectangle, two triangles are generated by generating the oblique sides so that the maximum angle becomes small. If only three nodes having the meshes can be detected as a result of the search, a triangle is generated by connecting these three nodes. Furthermore, if only two nodes having the meshes can be detected as a result of the search, no generation of a triangle is made, but instead, the search is made from three starting points which are a node above a next node having the mesh, a node to the top right of this next node, and a node to the right of this next node.

Thereafter, a step S9 shown in FIG. 5 outputs the finite element method mesh data related to the generated triangles and stores the finite element method mesh data into the storage unit 4, in the triangle dividing processor 3.

This embodiment of the finite element mesh generating method is characterized by the step S4 shown in FIG. 5 in particular, and the effects of the present invention can still be obtained even if the steps S5 through S7 are omitted. In other words, it is possible to generate the triangular meshes by deleting the unwanted lattice points and joining the unwanted lattice points with the adjacent lattice points based on the orthogonal meshes used in the finite difference method and reducing the number of the nodes. It is possible to utilize the orthogonal data used in the finite difference method as the data which forms the basis of the initial mesh, and the mesh portion to be made finer can be specified with ease regardless of whether it is made by the input from the user or is generated automatically. The orthogonal meshes used in the finite difference method are normally formed so that the meshes are fine at portions which are required for the analysis and so that no sudden changes exist. As a result, these characteristics of the orthogonal meshes are reflected to the triangles which are generated, and it is possible to generate optimum triangular meshes which are suited for the finite element method analysis.

Figure 3:
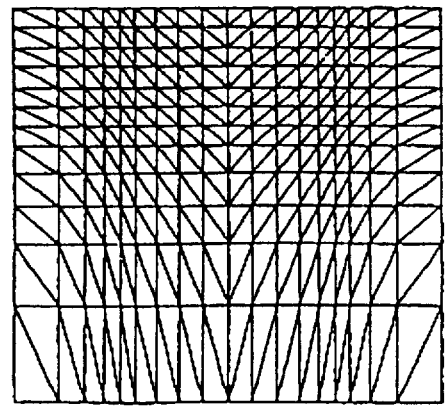
FIG. 3 is a diagram showing an example of triangular meshes obtained by a conceivable method.
Figure 16:
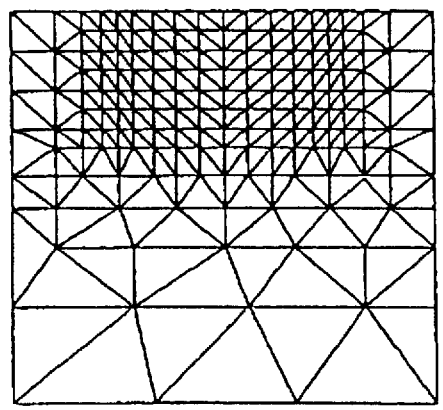
FIG. 16 is a diagram showing triangular meshes which are generated when steps S5 through S7 are omitted.

FIG. 16 is a diagram showing the triangular meshes which are generated in a case where the steps S5 through S7 shown in FIG. 5 are omitted. FIG. 16 corresponds to the case where the reference value A is set to 1.5 and the triangular meshes are generated under the same conditions in which the meshes shown in FIG. 3 are generated.

Figure 17:
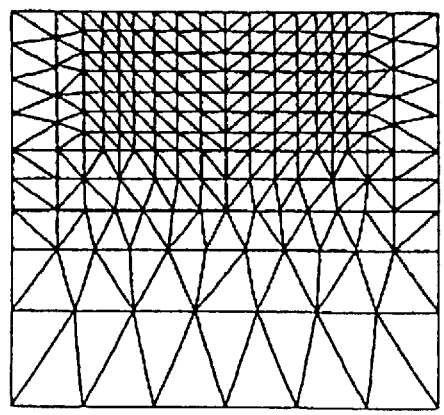
FIG. 17 is a diagram showing triangular meshes which are generated when steps S5 through S7 are omitted and lattice points are joined under certain conditions.

In addition, in the step S4 shown in FIG. 5, it is possible to generate the triangular meshes by deleting and joining the unwanted lattice points with the adjacent lattice points only when the conditions described above in conjunction with FIG. 10 are satisfied so that the number of the nodes is reduced. FIG. 17 is a diagram showing the triangular meshes which are generated in a case where the steps S5 through S7 are omitted and the lattice points are joined under certain conditions. FIG. 17 corresponds to the case where the reference value A is 1.5 and the triangular meshes are generated under the same conditions in which the meshes shown in FIG. 3 are generated.

Figure 18:
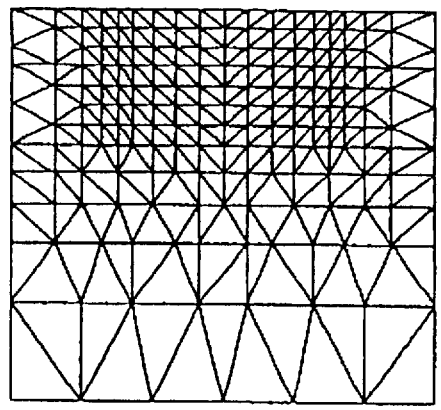
FIG. 18 is a diagram showing triangular meshes which are generated when a dividing process is carried out in a step S5.

FIG. 18 is a diagram showing the triangular meshes which are generated in a case where the dividing process is carried out in the step S5 shown in FIG. 5. FIG. 18 corresponds to the case where the reference value A is 1.5 and the triangular meshes are generated under the same conditions in which the meshes shown in FIG. 3 are generated.

Figure 19:
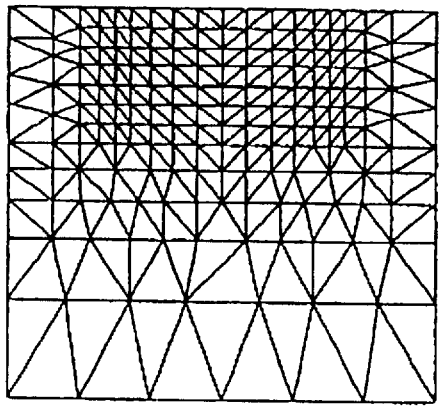
FIG. 19 is a diagram showing triangular meshes which are generated when a re-dividing process is carried out in a step S5 and lattices are further divided into two.

FIG. 19 is a diagram showing the triangular meshes which are generated in a case where the re-dividing process is carried out in the step S5 shown in FIG. 5 to further divide the lattices into two. FIG. 19 corresponds to the case where the reference value A is 1.5 and the triangular meshes are generated under the same conditions in which the meshes shown in FIG. 3 are generated.

Figure 20:
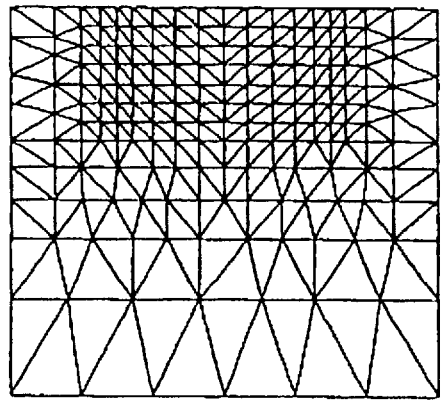
FIG. 20 is a diagram showing triangular meshes which are generated when an obtuse angled triangle detection and correction process is carried out in a step S6.

FIG. 20 is a diagram showing the triangular meshes which are generated in a case where the obtuse angled triangle detecting and correcting processes are carried out in the step S6 shown in FIG. 5. FIG. 20 corresponds to the case where the reference value A is 1.5 and the triangular meshes are generated under the same conditions in which the meshes shown in FIG. 3 are generated.

Figure 1:
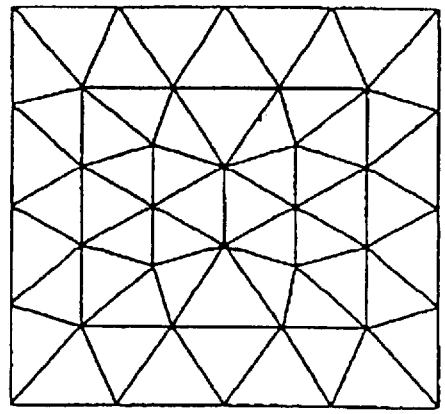
FIG. 1 is a diagram showing an example of triangular meshes obtained in a first prior art.
Figure 2:
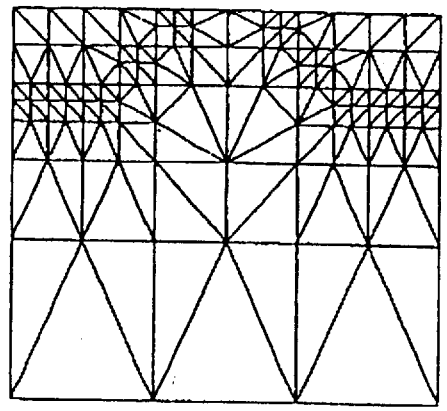
FIG. 2 is a diagram showing an example of triangular meshes obtained in a second prior art.

As may be seen by comparing FIGS. 16 through 20 with FIGS. 1 through 3, the present invention generates the triangles so that the meshes are fine at portions which are required for the analysis and so that no sudden change occurs in the meshes. As a result, it is possible to generate optimum triangular meshes which are suited for the finite element method analysis.

Next, a description will be given of an analyzing process using the triangular meshes. In the case of the analyzing process which involves boundary movement and shape change such as a simulation of the semiconductor device production process, it is in general more advantageous from the point of view of shape imitation and analyzing accuracy to use triangular meshes as compared to the analyzing process using orthogonal meshes. In addition, the analysis with respect to the shape change can be made by moving the vertex (or node) of the triangle. With respect to a process which involves growth or the like, it is desirable to automatically cope with the process regardless of the shape in order to improve the facility of operation of the device simulator.

In the case of an analyzing process which treats materials to be grown, such as when analyzing an oxidation process of the semiconductor device production method, it was impossible to make the analysis using the generated meshes if the material to be newly grown originally does not exist. The following analyzing methods were conceivable by the present inventor. According to a first conceivable analyzing method, the material to be grown is prepared in advance. In addition, according to a second conceivable analyzing method, the new material to be grown is added in advance before a material boundary is generated when growing this new material on the material boundary. In the case of the second analyzing method, it may be regarded that the material to be added in advance should have a minimum layer thickness that can be used in the device simulator so as not to affect the analysis.

Figure 21A:
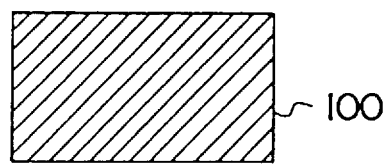
FIGS. 21A and 21B respectively are cross sectional views for explaining a first conceivable analyzing method.
Figure 21B:
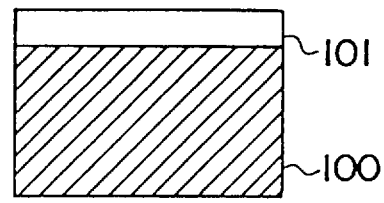

FIGS. 21A and 21B are cross sectional views for explaining the first conceivable analyzing method. For example, when directly oxidizing a silicon substrate 100 shown in FIG. 21A, a silicon oxide layer is actually grown by the oxidation, but the device simulator cannot simulate the growth of the silicon oxide layer unless the growing material, that is, the silicon oxide, exists. Hence, according to the first conceivable analyzing method, a deposition process is added before the analysis, so that a silicon dioxide layer 101 is added on the silicon substrate 100 as shown in FIG. 21B.

Figure 22A:
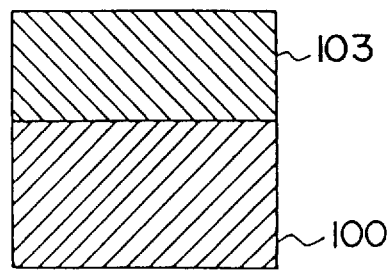
FIGS. 22A and 22B respectively are cross sectional views for explaining a second conceivable analyzing method.
Figure 22B:
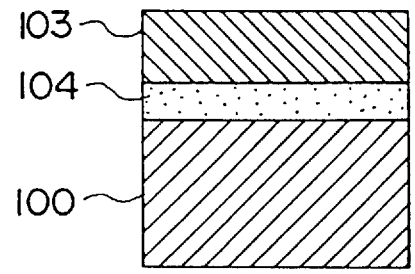

FIGS. 22A and 22B are cross sectional views for explaining the second conceivable analyzing method. For example, when carrying out a thermal process with respect to a structure having a titanium layer 103 provided on the silicon substrate 100 as shown in FIG. 22A, a titanium silicide layer is actually grown between the silicon substrate 100 and the titanium layer 103, but the device simulator cannot simulate the growth of the titanium silicide layer unless the growing material, that is, the titanium silicide, exists. Hence, according to the second conceivable analyzing method, a deposition process is added before the titanium layer 103 is formed on the silicon substrate 100, so that a titanium silicide layer 104 is added between the silicon substrate 100 and the titanium layer 103 as shown in FIG. 22B.

Therefore, according to the first conceivable analyzing method, in the analysis which treats the material to be grown, it is necessary to carry out an operation of adding the material to be grown on the substrate, although such an operation does not exist in the actual production process. In addition, if a specific portion where the material is grown is not the entire surface of the substrate, it is also necessary to carry out an operation to remove the added material from portions other than the specific portion.

On the other hand, according to the second conceivable analyzing method, when the material is to be newly grown on the material boundary, it is necessary to carry out an operation of adding the material which is to be grown before the material boundary is generated, although such an operation does not exist in the actual production process. Because this operation must be carried out before the material boundary is generated, it is necessary to add the material by tracing back the production process.

The first and second conceivable analyzing methods add the material by an operation which does not exist in the actual production process. For this reason, it is inconvenient in that the layer of the added material occupies an extra area in two-dimensions. In addition, depending on the relationships of the successive production processes, there is another inconvenience in that it may be impossible to insert between the successive processes the operation which does not exist in the actual production process. Furthermore, a decision that is made to determine whether or not to add the operation which does not exist in the actual production process is dependent upon the experience of the operator, and the operation which does not exist in the actual production process must be added manually by the operator. As a result, there is still another inconvenience in that a skilled operator is required.

Figure 23:
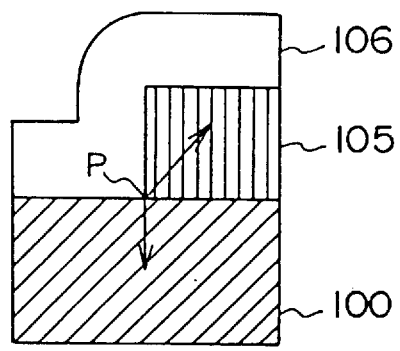
FIG. 23 is a cross sectional view for explaining an analyzing method for a case where 3 materials make contact at 1 point.

On the other hand, if 3 or more materials touch at 1 point, it is difficult to calculate a moving quantity of the point at an analyzing portion. FIG. 23 is a cross sectional view showing an example of such a case where 3 materials touch at 1 point. In FIG. 23, a polysilicon layer 105 is provided on the silicon substrate 100, and a silicon dioxide layer 106 is provided on the silicon substrate 100 so as to cover this polysilicon layer 105. A point P where the silicon substrate 100, the polysilicon layer 105 and the silicon dioxide layer 106 touch moves as an interface moves as indicated by arrows due to oxidation. However, there are inconveniences in that the calculation of the moving quantity is difficult and the processing after the point P moves is difficult.

Next, a description will be given of an analyzing method and an analyzing apparatus according to the present invention in which the above described inconveniences can be eliminated, and a material which is required for the growth when analyzing the growing process of the material can be added automatically.

First, a description will be given of an embodiment of the analyzing method according to the present invention. In this embodiment of the analyzing method, the present invention is applied to a device simulator which carries out an analyzing process involving moving boundaries and changing shapes such as the simulation of the semiconductor device production process using triangular meshes. For the triangular meshes, it is possible to use the triangular meshes generated by the embodiments of the finite element mesh generating method and apparatus described above.

In this embodiment of the analyzing method, the above described inconveniences are eliminated by generating the mesh which has information related to the material to be grown and becomes a growing point or, a new material is inserted at the material boundary when 3 or more materials touch at 1 point so that 3 or more materials will not touch at 1 point. More particularly, the following processes are carried out.

In the following description, the cross sectional views are the images of the mesh data which are generated and displayed on a display portion of an input unit of the analyzing apparatus which will be described later in conjunction with FIG. 50.

a) Process of Adding Growing Material:

Before carrying out the analyzing process, a thin layer made of a material to be grown (hereinafter simply referred to as a growing material) and having a thickness of 0 or an extremely small thickness compared to other analyzing portions is added with respect to a portion where the growing material is grown.

Figure 24A:
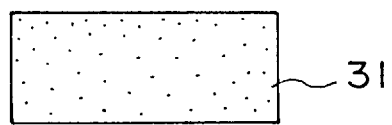
FIGS. 24A and 24B respectively are cross sectional views for explaining analysis of a process which directly oxidizes a substrate in an embodiment of an analyzing method according to the present invention.
Figure 24B:
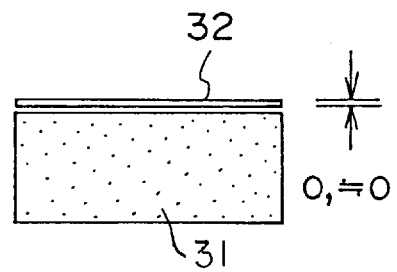

FIGS. 24A and 24B are cross sectional views for explaining a case where a process of directly oxidizing a substrate is analyzed. FIG. 24A shows a silicon substrate 31 before the direct oxidation, and FIG. 24B shows a growing material layer 32 added on the silicon substrate 31.

FIGS. 25A and 25B are cross sectional views for explaining a case where an oxidation process after the layer is formed on the substrate is analyzed. FIG. 25A shows a titanium layer 33 formed on the silicon substrate 31, and FIG. 25B shows the growing material layer 32 which is inserted and added between the silicon substrate 31 and the titanium layer 33.

Figure 30:
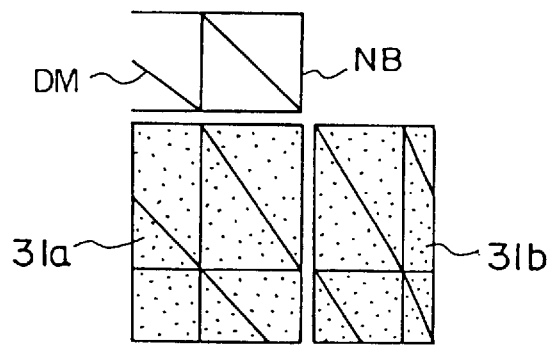
FIG. 30 is a cross sectional view for explaining a processing for a case where a portion on which a material is grown and a portion on which no material is grown coexist on the substrate surface and the two portions make contact.
Figures 31A, 31B, 31C:
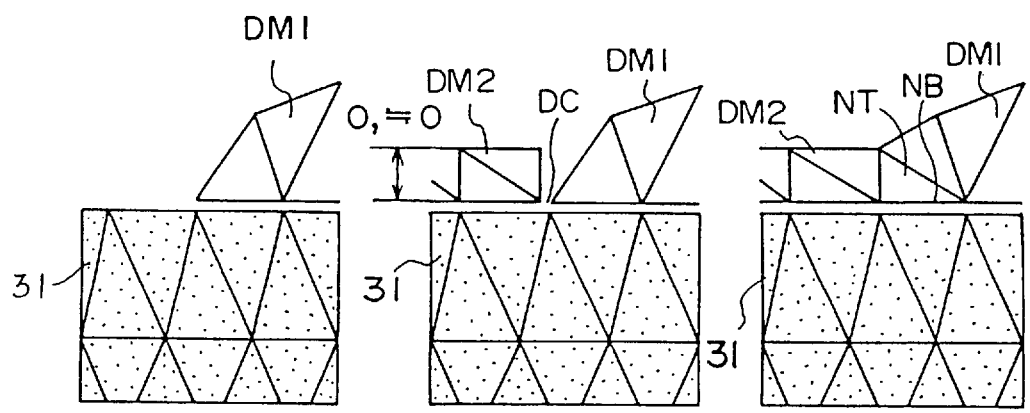
FIGS. 31A, 31B and 31C respectively are cross sectional views for explaining a processing for a case where a portion on which a material is grown and a portion on which the same material is already grown coexist on the substrate surface and the two portions make contact.

FIGS. 26A and 26B are cross sectional views for explaining a case where a process of removing the layer after the layer is formed on the substrate is analyzed. FIG. 26A shows a non-growing material layer 34 that is removed after being formed on the silicon substrate 31, and FIG. 26B shows the growing material layer 32 which is inserted and added between the silicon substrate 31 and the non-growing material layer 34 which is removed.

b) Process of Adding Growing Material on Surface:

FIGS. 27A and 27B are cross sectional views for explaining a case where a process of forming a layer on a surface of a substrate or the like by oxidizing the substrate or the like is analyzed. FIG. 27A shows a portion of the substrate 31 formed by triangular meshes, and FIG. 27B shows dummy meshes DM added on the surface of the substrate 31. The dummy meshes DM form the growing material layer 32. In other words, if a material which is to be newly grown exists at a boundary portion of the surface of the substrate 31, a pair of dummy meshes DM is added with respect to the meshes of the portion where the material is to be newly grown, that is, with respect to a side of each triangular mesh touching the substrate surface. In this case, rectangular meshes are added and each rectangular mesh is divided into 2 triangular meshes so as to obtain the dummy meshes DM. Thereafter, out of the information related to the boundary portion which originally was the substrate surface, the information related to the surface side is changed into information related to the growing material, and information related to the surface side of each newly added dummy mesh is registered as new boundary information.

c) Process of Adding Growing Material to Material Boundary:

FIGS. 28A and 28B are cross sectional views for explaining a case where a process of forming a layer at a boundary portion of 2 adjacent layers by carrying out a thermal process with respect to a multi-layer structure (or multi-level structure) is analyzed. FIG. 28A shows portions of the substrate 31 formed by triangular meshes and the titanium layer 33 formed on the substrate 31. FIG. 28B shows the dummy meshes DM inserted and added between the substrate 31 and the titanium layer 33. The dummy meshes DM form the growing material layer 32. In other words, when the material to be newly grown exists at the boundary portion between the substrate 31 and the titanium layer 33, a pair of dummy meshes is added with respect to the sides of the meshes at the growing portion, that is, with respect to the sides of the triangular meshes on both sides of the boundary portion and touching the respective boundaries. In this case, rectangular meshes are added, and each rectangular mesh is divided into 2 triangular meshes, thereby obtaining the dummy meshes DM. Thereafter, information related to one of the boundaries of the boundary portion is changed into information related to the material that is newly introduced, and information related to the surface side of each newly added dummy mesh DM is registered as new boundary information.

d) Process with Respect to Analyzing Boundaries:

FIGS. 29A and 29B are cross sectional views for explaining the processing of analyzing boundaries of the meshes newly made in the process b) and/or the process c) described above, that is, the dummy meshes DM. In FIGS. 29A and 29B, those parts which are the same as those corresponding parts in FIGS. 27A, 27B, 28A and 28B are designated by the same reference numerals, and a description thereof will be omitted. With respect to a portion shown in FIG. 29A which touches the analyzing boundary of the dummy mesh DM made in the process b) and/or the process c) described above and is indicated by the leftwardly inclined hatching, it is impossible to carry out a normal analyzing process in the device simulator unless the information related to the analyzing boundaries is set. More particularly, unless the ends of the dummy meshes DM are defined, it would become possible to also form a layer on a portion where no dummy mesh DM exists, and it would be impossible to thereafter normally carry out an analyzing process. The analyzing boundaries indicate peripheral portions of an analyzing range, and indicate right, left and bottom ends of the analyzing range in two-dimensions. Hence, in this embodiment of the analyzing method, a side which touches the analyzing boundary as shown in FIG. 29B is registered as new boundary information NB, one material (titanium layer 33 or air 35 in this case) is regarded as the newly introduced material, and the other material (substrate 31 in this case) is registered as the analyzing boundary. In this case, both the analyzing boundary and the air 35 are treated as materials.

e) Process With Respect to Growing Portion and Non-Growing Portion Which Touch:

FIG. 30 is a cross sectional view for explaining the processing for a case where a portion (hereinafter referred to as a growing portion) where a material is grown on a surface of a substrate or the like and a portion (hereinafter referred to as a non-growing portion) where a material is not grown coexist after the process b) described above and the growing portion and the non-growing portion touch each other. In FIG. 30, those parts which are the same as those corresponding parts in FIGS. 27A, 27B, 28A and 28B are designated by the same reference numerals, and a description thereof will be omitted. In FIG. 30, the dummy meshes DM exist on a growing portion 31a of the silicon substrate 31 because a material is grown on the growing portion 31a, but no dummy mesh DM exists on a non-growing portion 31b of the silicon substrate 31 because a material is not grown on the non-growing portion 31b. In this case, the boundary information of the dummy meshes DM is not set at a part of a connecting portion where the growing portion 31a and the non-growing portion 31b connect. Hence, in such a case, this embodiment of the analyzing method newly registers the boundary information NB between the air and the growing material in the following manner. In other words, a side of the dummy mesh DM which is close to the surface of the non-growing portion 31b at the connecting portion is registered as the boundary information NB between the air and the growing material. Of course, it is not essential that the growing portion 31a and the non-growing portion 31b are portions of the same silicon substrate 31, and the growing portion 31a and the non-growing portion 31b may be portions made of mutually different materials.

f) Process With Respect to Growing Portion and Already Grown Portion Which Touch:

FIGS. 31A, 31B and 31C are cross sectional views for explaining the processing for a case where a growing portion where a material is grown on a surface of a substrate or the like and a portion (hereinafter referred to as an already grown portion) where the same material is not grown coexist after the process b) described above and the growing portion and the already grown portion touch each other. In FIGS.

Figures 32A, 32B:
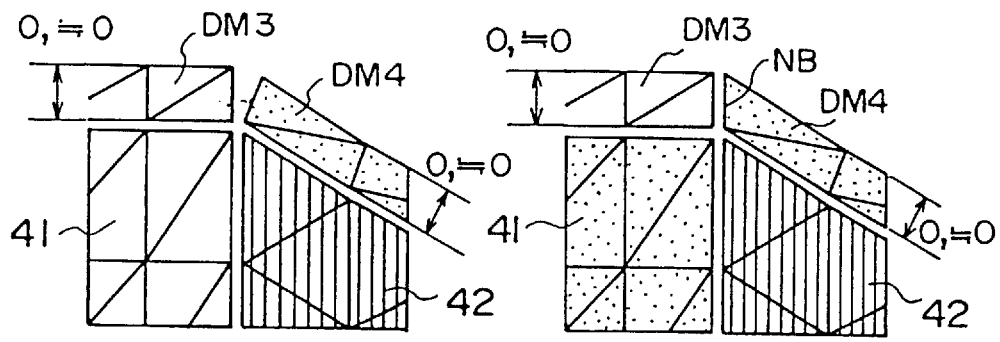
FIGS. 32A and 32B respectively are cross sectional views for explaining a processing for a case where different materials are grown on the substrate surface.
Figures 33A, 33B, 33C:
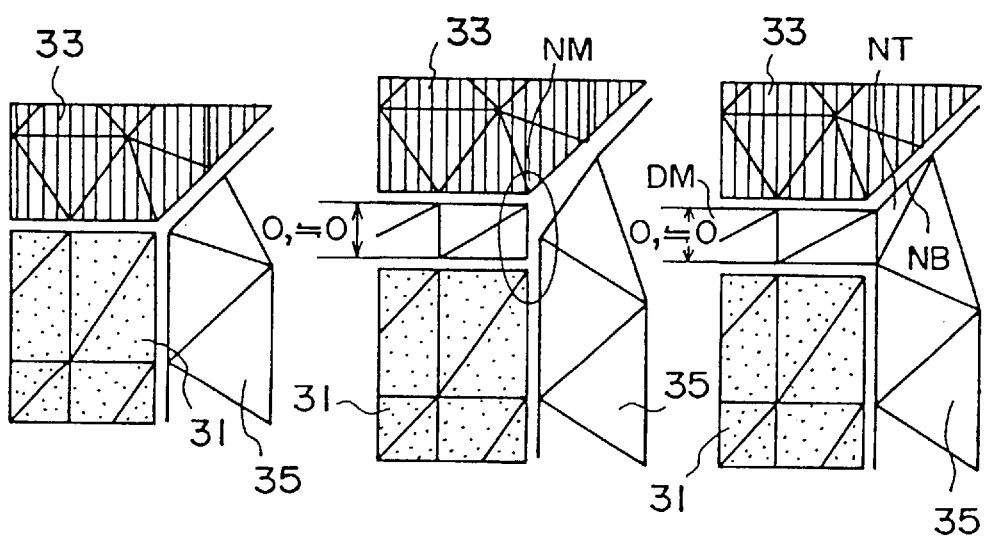
FIGS. 33A, 33B and 33C respectively are cross sectional views for explaining a processing for a case where a material newly added to a material boundary and the same existing material make contact.
Figure 34:
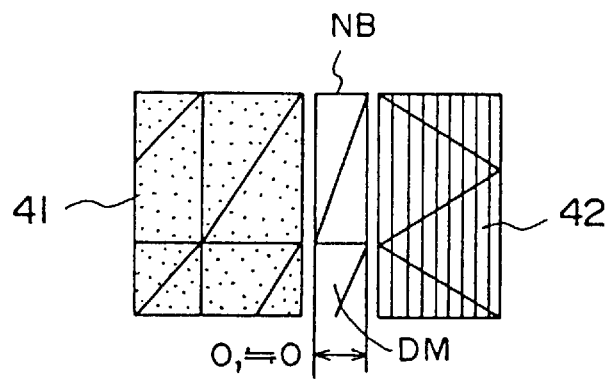
FIG. 34 is a cross sectional view for explaining a processing for a case where the material newly added to the material boundary makes contact with the surface.
Figures 35A, 35B:
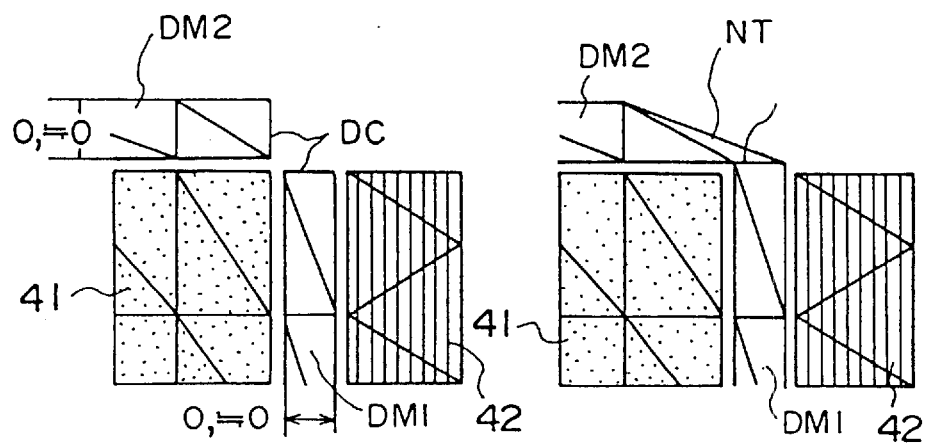
FIGS. 35A and 35B respectively are cross sectional views for explaining a processing for a case where the material already added to the material boundary and the same material which is grown on the surface make contact.
Figures 36A, 36B:
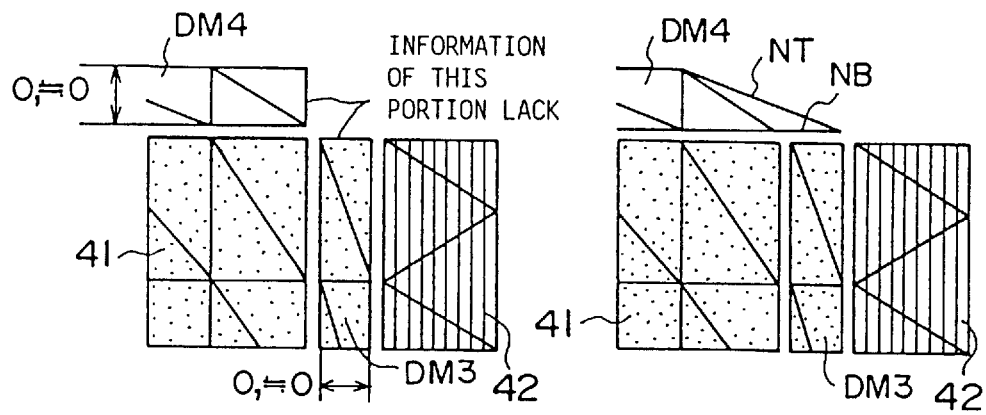
FIGS. 36A and 36B respectively are cross sectional views for explaining a processing for a case where the material already added to the material boundary and a different material grown on the surface make contact.
Figures 37A, 37B:
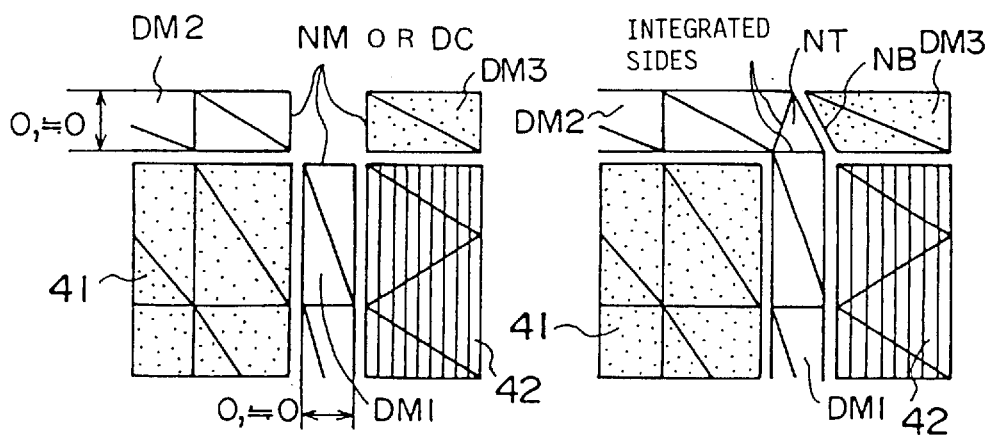
FIGS. 37A and 37B respectively are cross sectional views for explaining a processing for a case where 3 or more materials which are grown make contact at the surface.
Figure 38A:
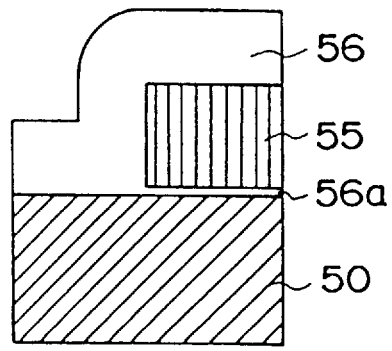
FIGS. 38A and 38B respectively are cross sectional views for explaining a processing of a point where 2 or more materials make contact.
Figure 38B:
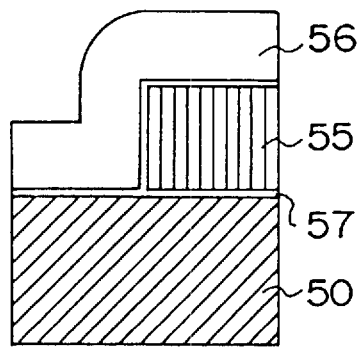
Figure 42:
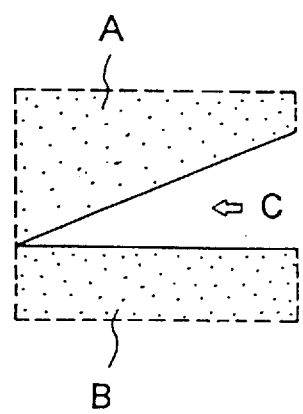
FIG. 42 is a cross sectional view showing a state where materials A and B exist on both sides of a target material.
Figure 43A:
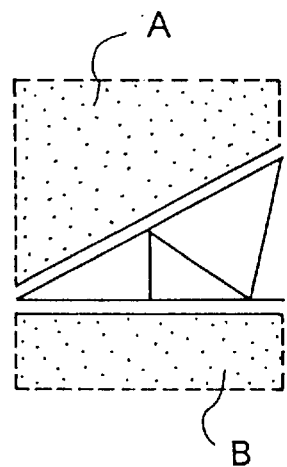
FIGS. 43A and 43B respectively are cross sectional views for explaining a process which judges whether or not to add the dummy meshes.
Figure 43B:
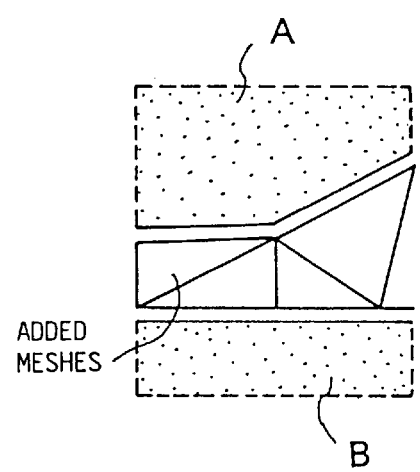
Figure 45A:
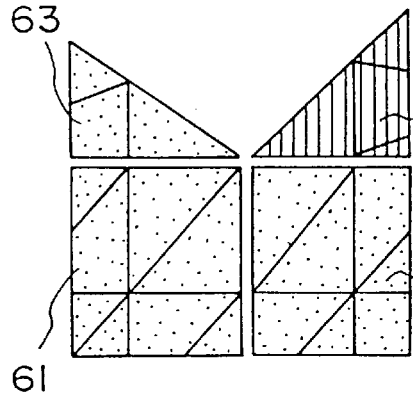
FIGS. 45A and 45B respectively are cross sectional views for explaining a processing of a point where a plurality of added materials make contact.
Figure 45B:
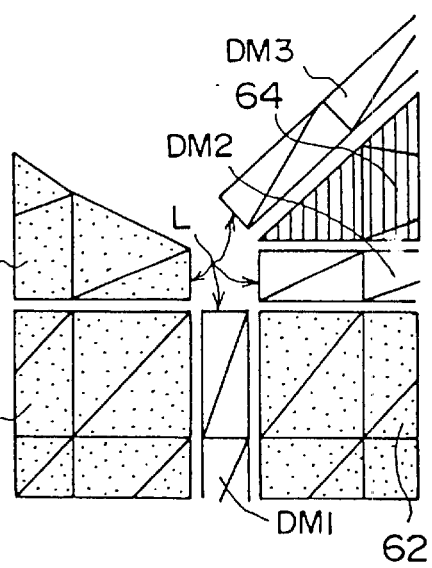
Figures 46A, 46B:
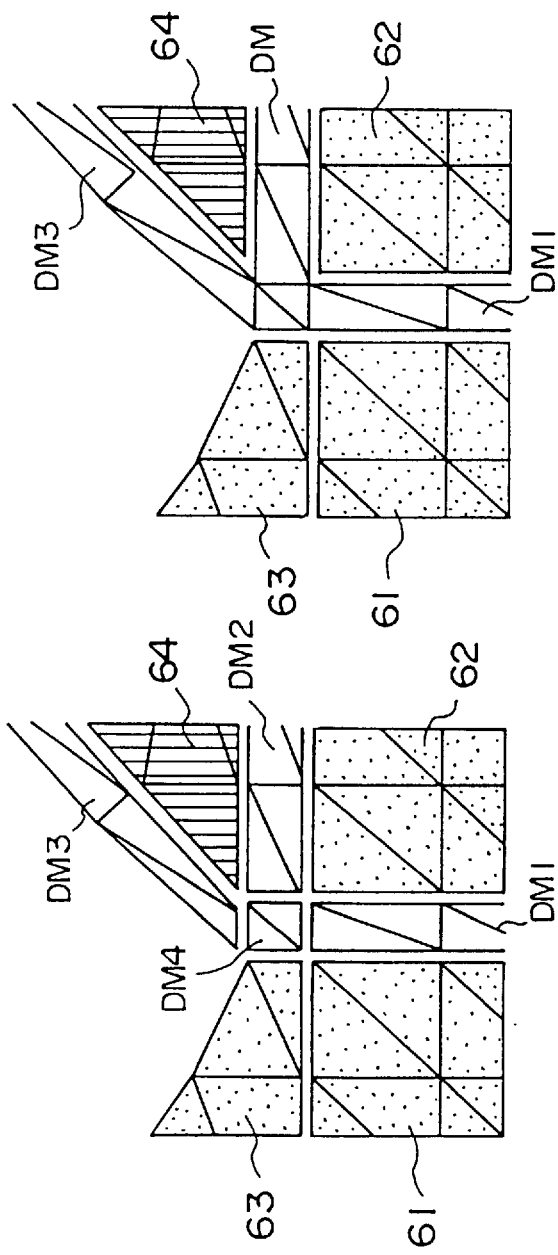
FIGS. 46A and 46B respectively are cross sectional views for explaining a processing of a point where a plurality of added materials make contact.

31A, 31B and 31C, those parts which are the same as those corresponding parts in FIGS. 27A, 27B, 28A and 28B are designated by the same reference numerals, and a description thereof will be omitted. In this case, when the process e) described above is carried out, a surface which is newly introduced at the connecting portion between a material which is already grown as shown in FIG. 31A and a material which is to be grown as shown in FIG. 31B becomes discontinuous at a portion DC and a crack is formed. In other words, dummy meshes DM1 corresponding to the already grown material and the dummy meshes DM2 corresponding to the same material which is to be grown become discontinuous at the portion DC. Hence, in this embodiment of the analyzing method, a dummy mesh which touches the connecting portion between the dummy meshes DM1 and DM2 is added as shown in FIG. 31C, so as to integrate the mutually touching sides of the dummy meshes DM1 and DM2. In this case, the dummy mesh which is added to the connecting portion is a new triangular mesh NT which is added to the dummy meshes DM1 so as to touch a side at a boundary portion of a triangular mesh which is one of the dummy meshes DM2 and has a side which touches the connecting portion. Out of the sides of the triangular dummy mesh NT, the side touching the silicon substrate 31 is registered as the new boundary information NB.

g) Process With Respect to Different Materials Grown on Surface:

FIGS. 32A and 32B are cross sectional views for explaining a processing for a case where different materials are grown on a surface of a substrate or the like after the process b) described above. In FIGS. 32A and 32B, those parts which are the same as those corresponding parts in FIGS. 27A, 27B, 28A, 28B and 30 are designated by the same reference numerals, and a description thereof will be omitted. For the sake of convenience, it will be assumed that dummy meshes DM3 corresponding to a first material formed on a portion 41 are added, and dummy meshes DM4 corresponding to a second material different from the first material and formed on a portion 42 are added as shown in FIG. 32A. In this case, it is impossible to thereafter normally carry out the analyzing process unless a boundary portion between the mutually different first and second materials is defined. Hence, in this embodiment of the analyzing method, a side of the dummy mesh DM4 touching the dummy mesh DM3 is registered as the new boundary information NB as shown in FIG. 32B.

h) Process With Respect to Newly Added Material and Already Existing Same Material Which Touch:

FIGS. 33A, 33B and 33C are cross sectional views for explaining a processing for a case where a material newly added to a material boundary and an existing same material touch each other after the process c) described above. In FIGS. 33A, 33B and 33C, those parts which are the same as those corresponding parts in FIGS. 27A, 27B, 28A and 28B are designated by the same reference numerals, and a description thereof will be omitted. When dummy meshes DM corresponding to the same material as a layer 35 is added by the process c) described above with respect to a structure which is made up of the silicon substrate 31, the titanium layer 33 and the layer 35 as shown in FIG. 33A, a state shown in FIG. 33B is obtained. In FIG. 33B, a non-matching portion NM is introduced between the meshes corresponding to the layer 35 and the dummy meshes DM. When this non-matching portion NM is introduced, it is impossible to thereafter normally carry out the analyzing process. Hence, in this embodiment of the analyzing method, a triangular dummy mesh NT is added to a side of one of the meshes corresponding to the existing layer 35 at the boundary touching the connecting portion between the dummy meshes DM and the meshes corresponding to the existing layer 35 as shown in FIG. 33C, so that a portion which touches the dummy mesh DM becomes a side of this triangular dummy mesh NT. As a result, it is possible to integrate the mutually touching sides of the mesh corresponding to the layer 35 and the dummy mesh DM. In addition, a side of this triangular dummy mesh NT touching the titanium layer 33 is registered as the new boundary information NB.

i) Process With Respect to Material Added to Material Boundary and Touching Surface:

FIG. 34 is a cross sectional view for explaining a processing for a case where a material which is newly added to the material boundary touches the surface. For the sake of convenience, it will be assumed that the dummy meshes DM are added between the portion 41 and the portion 42 as shown in FIG. 34. In this case, unless the portions 41 and 42 and the dummy mesh DM which corresponds to the material formed between the portions 41 and 42 touch at the surface, that is, the top surface in FIG. 34, it is impossible to thereafter normally carry out the analyzing process. Hence, in this embodiment of the analyzing method, a side of the dummy mesh DM touching the surfaces of the portions 41 and 42 is registered as the new boundary information NB as shown in FIG. 34.

j) Process With Respect to Touching Same Material Added to Material Boundary and Surface:

FIGS. 35A and 35B are cross sectional views for explaining a processing for a case where a material already grown on the material boundary and the same material which is grown on the surface touch each other after carrying out the process i) described above. In FIGS. 35A and 35B, those parts which are the same as those corresponding parts in FIG. 34 are designated by the same reference numerals, and a description thereof will be omitted. When growing on the surface the dummy meshes corresponding to the same material as the dummy meshes DM1 added between the portions 41 and 42 as shown in FIG. 35A, it must be defined that the dummy meshes DM1 and DM2 touch each other. Otherwise, when thereafter carrying out the analyzing process, it will be recognized that the same material at the 2 portions is discontinuous at a portion DC, and a normal analyzing process cannot be carried out. Hence, in this embodiment of the analyzing method, a triangular dummy mesh NT is added to a side of the dummy mesh DM2 at the boundary touching the connecting portion between the dummy meshes DM2 and DM1 as shown in FIG. 35B, so that the portion connecting the dummy meshes DM2 and the dummy meshes DM1 is formed by the side of this triangular dummy mesh NT. As a result, it is possible to integrate 2 sides of the mutually touching dummy meshes DM1 and DM2.

k) Process With Respect to Touching Different Growing Materials on Material Boundary and Surface:

FIGS. 36A and 36B are cross sectional views for explaining a processing for a case where a material already added to the material boundary and a different material grown on the surface touch each other after the process i) described above. In FIGS. 36A and 36B, those parts which are the same as those corresponding parts in FIG. 34 are designated by the same reference numerals, and a description thereof will be omitted. When growing on the surface the dummy meshes DM4 corresponding the material which is different from the dummy meshes DM3 which are added between the portions 41 and 42 as shown in FIG. 36A, the boundary portion between the dummy meshes DM1 and DM2 must be defined. Otherwise, when thereafter carrying out the analyzing process, it will be impossible to recognize the relationship of the 2 different materials, and a normal analyzing process cannot be carried out. Hence, in this embodiment of the analyzing method, a triangular dummy mesh NT is added to a side of the dummy mesh DM4 at the boundary touching the connecting portion between the dummy meshes DM4 and DM3 as shown in FIG. 36B, so that the portion connecting the dummy meshes DM4 and the dummy meshes DM3 is formed by the side of this triangular dummy mesh NT. Out of the sides of this triangular dummy mesh NT, the side which touches the dummy mesh DM3 is registered as the new boundary information NB. As a result, it is possible to correctly recognize the boundary portion between the mutually touching dummy meshes DM3 and DM4.

l) Process With Respect to 3 or More Growing Materials Which Touch:

FIGS. 37A and 37B are cross sectional views for explaining the processing for a case where 3 or more materials grown touch at the surface after carrying out the process i) described above. In FIGS. 37A and 37B, those parts which are the same as those corresponding parts in FIG. 34 are designated by the same reference numerals, and a description thereof will be omitted. When growing the dummy meshes DM2 corresponding to the same materials as the dummy meshes DM1 added between the portions 41 and 42 and growing the dummy meshes DM3 corresponding to the material different from the dummy meshes DM2 on the surface as shown in FIG. 37A, the boundary portions of the dummy meshes DM1, DM2 and DM3 must be defined. Otherwise, when thereafter carrying out the analyzing process, it would be impossible to recognize the relationships of the 3 materials, and a normal analyzing process cannot be carried out. Hence, in this embodiment of the analyzing method, a triangular dummy mesh NT is added to a side of the dummy mesh DM2 at the boundary touching the connecting portion between the dummy meshes DM2 and DM1 as shown in FIG. 37B, so that the portion connecting the dummy meshes DM2 and the dummy meshes DM1 is formed by the side of this triangular dummy mesh NT. Thus, it is possible to integrate the sides of the mutually touching dummy meshes DM1 and DM2. In addition, out of the sides of this triangular dummy mesh NT, the side which touches the dummy mesh DM3 is registered as the new boundary information NB. As a result, it is possible to correctly recognize the boundary portion of the mutually touching dummy meshes DM1, DM2 and DM3. When 3 ore more materials touch at the boundary portion, the number of the triangular dummy meshes NT that are added to prevent the non-matching portion NM or the discontinuous portion DC is set to a number which is obtained by subtracting 2 from a number of boundaries at the boundary portion.

m) Process with Respect to 3 or More Materials which Touch:

As described above in conjunction with FIG. 23, when 3 materials (substrate 100 and layers 105 and 106) touch at the point P, for example, a normal shape representation cannot be made because a plurality of boundary moving directions exist. Hence, in this embodiment of the analyzing method, the boundaries are separated by inserting and adding a material at the boundaries, so that the plurality of moving directions shift to other boundaries. In this case, the material to be inserted and added at the boundary may be one of the materials which touch each other or a completely new material. FIG. 38A shows the former case, while FIG. 38B shows the latter case. In FIG. 38A, a layer 56a of the same material as the layer 56 is inserted and added at the boundary of the layers 50, 55 and 56. In addition, in FIG. 38B, a layer 57 of a new material which is different from those of the layers 50, 55 and 56 is inserted and added at the boundary of the layers 50, 55 and 56. For example, the layers 50, 55 and 56 are respectively are made of silicon, polysilicon and silicon dioxide.

n) Process Using Table Relating Growing Materials:

When the growing materials are different on a specific surface and the material boundary, the process itself becomes different on the specific surface and on the material boundary. However, the operation of newly adding a material and the operation of updating the information related to the material boundary are basically the same. Hence, instead of using a table shown in FIG. 39 which specifies the growing material on the material boundary and a table shown in FIG. 40 specifying the growing material on the specific surface, this embodiment of the analyzing method treats both air and the analyzing boundary as materials and processes the meshes corresponding to each of the materials using the same table shown in FIG. 41 depending on the materials on both sides of the boundary. In FIGS. 39 through 41 and FIG. 44 which will be described later, a symbol "---" indicates that the material is not grown.

o) Process to Judge whether or not to add Dummy Mesh:

A judgement to determine whether or not to add a dummy mesh with respect to a material having an end point where a plurality of materials touch each other is made as follows. In other words, an end point is taken as the center and the materials on both sides including air are regarded as materials on both sides of the boundary as shown in FIG. 42, and a reference is made to the table shown in FIG. 41. In FIG. 42, materials A and B respectively exist on both sides of a target material C. When a reference is made to the table shown in FIG. 41 and the growing material exists, dummy meshes are added as shown in FIGS. 43A and 43B. FIG. 43A is a cross sectional view showing a state before the dummy meshes are added, and FIG. 43B is a cross sectional view showing a state after the dummy meshes are added. The process can be carried out similarly for the case where the growing material is the same as or is different from the target material. Furthermore, it is possible to cope with a situation where the same material exists on both sides of a point where 4 or more materials touch each other, by setting the materials as indicated by the hatching in a table shown in FIG. 44 with respect to portions where the same material intersect. By using the table shown in FIG. 44, it is possible to carry out the processes f) through h), j), k), m) and the like by employing the same processing method.

p) Process with Respect to Point where Plurality of Added Materials Touch:

When a plurality of added materials touch at 1 point, a process of adding the meshes to the connecting portion is carried out so that the process is normally carried out at the connecting portion. However, the processes become too complicated and troublesome if the processes are to be carried out in accordance with each of the various cases. Hence, this embodiment of the analyzing method focuses on the fact that the operation of adding the meshes and the operation of rewriting the boundary information are essentially the same. In other words, this embodiment of the analyzing method carries out a preparation so that the same situation occurs for each of the cases, so that there is no need to carry out different processes depending on the various cases. More particularly, the meshes at candidates of positions where the meshes are to be added, that is, the meshes at the end points where the dummy meshes have already been added, are successively stored so as not to introduce discrepancy in the order, and a loop is formed. In addition, if the air which is regarded as a material touches the loop, the process is carried out by regarding that continuity exists at the air portion. Accordingly, in the case of the shape made up of portions 61 through 64 as shown in FIG. 45A, the loop is formed at the sides indicated by L in FIG. 45B after adding the dummy meshes DM1 through DM3. Next, the dummy mesh DM4 which forms the loop is divided into triangular meshes as shown in FIG. 46A, so as to generate dummy meshes made up of the dummy meshes DM1 through DM4. When the material corresponding to the added dummy meshes and the materials corresponding to the meshes touching the added dummy meshes differ, a portion where the side of the dummy mesh DM4 and the side of the mesh of the portion 63 touch is registered as the boundary in the particular case shown in FIG. 46B. On the other hand, when the material corresponding to the added dummy meshes and the materials corresponding to the meshes touching the added dummy meshes are the same, the side of the dummy mesh DM1 and the side of the dummy mesh DM4 touching each other are integrated, the side of the dummy mesh DM2 and the side of the dummy mesh DM4 touching each other are integrated, and the side of the dummy mesh DM3 and the side of the dummy mesh DM4 touching each other are integrated in the particular case shown in FIG. 46B.

q) Process of Writing Information into Table:

When a process such as integration of the touching sides is carried out after adding the dummy meshes, one of the integrated meshes no longer is required and is therefore deleted. For this reason, the information related to the sides and the nodes becomes intermittent, thereby not being preferable from the point of view of carrying out the analyzing process. In addition, if a method of updating the information related to the deleted portion is employed, it becomes necessary to provide a work space amounting to the sum total of the sides and the sum total of the nodes. Hence, in this embodiment of the analyzing method, a dummy region amounting to the meshes used at the material boundary is secured. The information related to the added meshes is stored in this dummy region, and the information is actually written into the table after carrying out the integration process.

r) Sorting Process:

When the process of adding the dummy meshes is carried out, the information related to the material boundary is changed. For this reason, a situation where boundaries having the same information touch, that is, a boundary which should originally be continuous is discontinuous, may occur. Hence, in this embodiment of the analyzing method, the integration process is carried out after detecting the continuous boundary. After carrying out the integration process, the number portions of the boundaries which disappear due to the integration are sorted so as to be consecutive.

s) Dummy Mesh Deleting Process:

The above described integration process is carried out with respect to all of the boundaries, and thus, meshes which are unnecessary after the analyzing process may exist. Hence, in this embodiment of the analyzing method, the side having the same length as the added mesh, that is, the side which does not grow, is detected and deleted after the analyzing process. More particularly, with respect to the triangular meshes on both sides of the detected side, the information related to the other 2 sides is updated. FIG. 47A shows a case where triangular meshes T1 and T3 exist on both sides of a triangular mesh T2 having side numbers $\underline{a}$, b and c and nodes 1, 2 and 3. FIG. 48A is a diagram showing the contents of a table that is used for the case shown in FIG. 47A. In this case, when the side c shown in FIG. 47A is deleted, only the side a of the triangular mesh T2 remains as shown in FIG. 47B, and the contents of the table are updated as shown in FIG. 48B.

Of course, only one of the processes a) through s) described above may be carried out or, an appropriate combination of a plurality of such processes may be carried out.

Figure 49:
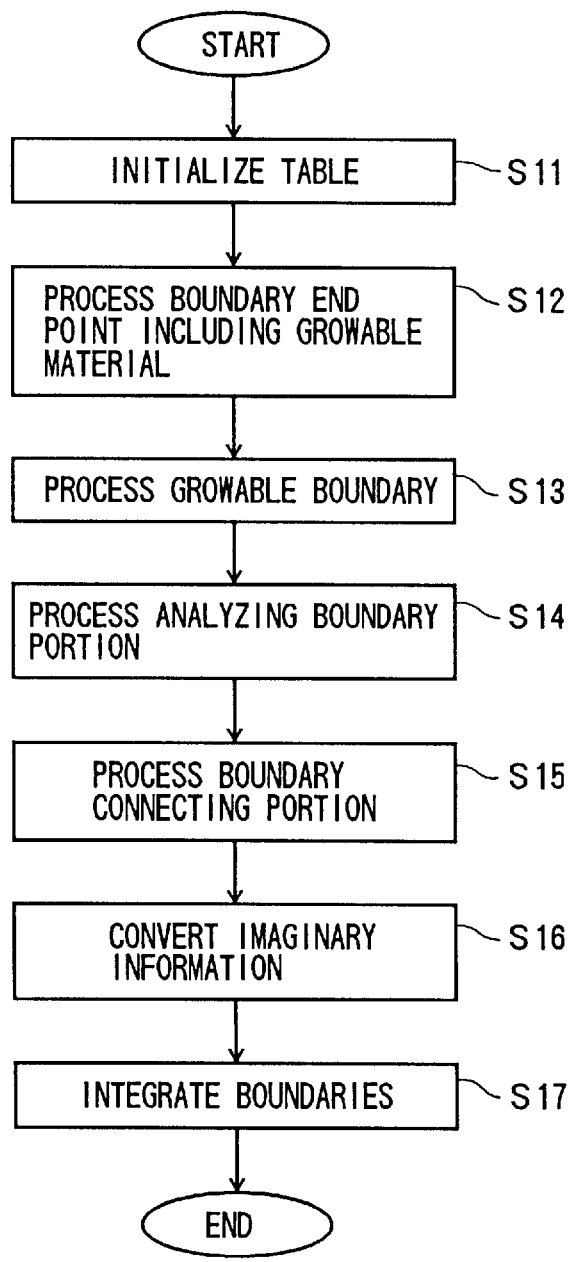
FIG. 49 is a flow chart for explaining the embodiment of the analyzing method according to the present invention.

FIG. 49 is a flow chart for explaining this embodiment of the analyzing method. The process shown in FIG. 49 corresponds to the preparation for the material growth analysis on the device simulator.

In FIG. 49, a step S11 carries out the above described processes a), n), o) or the like, and sets the table of growing materials depending on the kinds of growth of the materials. A step S12 carries out the above described processes h), j), k), m), o) or the like, and adds one or more meshes to the boundary end point portion. A step S13 carries out the above described processes b), c), m), n) or the like, and adds one or more meshes to the boundary where the material is grown. A step S14 carries out the above described process d) or the like, and processes a portion of each added mesh touching an analyzing boundary. A step S15 carries out the above described processes e), f), g), h), i), j), k), l), m), p) or the like, and processes a portion where materials added to the respective boundaries touch each other. A step S16 carries out the above described process r) or the like, and integrates intermittent boundary information. A step S17 carries out the above described process q) or the like, and forms information related to the dummy meshes into information for use in the analysis.

Next, a description will be given of an embodiment of the analyzing apparatus according to the present invention. In this embodiment of the analyzing apparatus, the present invention is applied to a device simulator which carries out an analyzing process involving moving boundaries and changing shapes such as the simulation of the semiconductor device production process using triangular meshes. For the triangular meshes, it is possible to use the triangular meshes generated by the embodiments of the finite element mesh generating method and apparatus described above. Furthermore, the analyzing apparatus according to the present invention may be a part of the finite element mesh generating apparatus described above.

Figure 50:
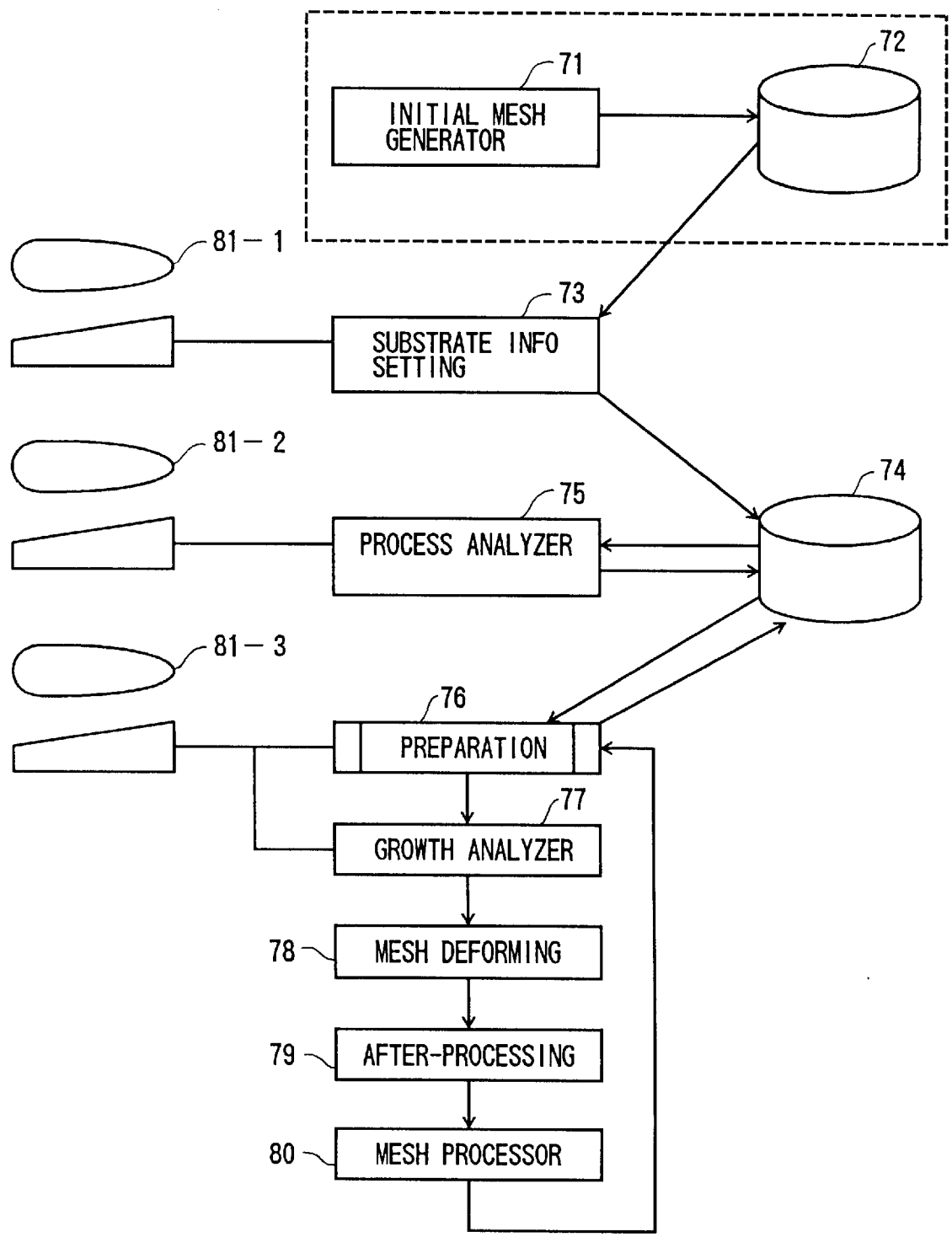
FIG. 50 is a system block diagram showing the general construction of an embodiment of an analyzing apparatus according to the present invention.

FIG. 50 is a system block diagram showing this embodiment of the analyzing apparatus according to the present invention. In FIG. 50, the device simulator generally includes an initial mesh generator 71, a mesh data storage 72, a substrate information setting unit 73, an analyzing data storage 74, a process analyzer 75, a preparation unit 76, a growth analyzer 77, a mesh deforming unit 78, an after-processing unit 79, a mesh processor 80, and input units 81-1 through 81-3 which are connected as shown. The input units 81-1 through 81-3 may be formed by a single input unit.

The initial mesh generator 71 carries out a mesh dividing process to obtain mesh data, and stores the mesh data into the mesh data storage 72. The substrate information setting unit 73 sets substrate information based on substrate information input from the input unit 81-1 and the mesh data read from the mesh data storage 72, and stores the set substrate information in the analyzing data storage 74. The process analyzer 75 analyzes each process based on information which is related to each process and is input from the input unit 81-2 and the data read from the analyzing data storage 74, and stores analyzing data related to the analyzed results into the analyzing data storage 74.

The preparation unit 76 carries out various preparations based on information which is related to the growing process and is input from the input unit 81-3 and the analyzing data read from the analyzing data storage 74. The preparations include one of the above described processes a) through r) or a combination of at least two of the processes a) through r). The growth analyzer 77 analyzes the growth process based on the information which is related to the growing process and is input from the input unit 81-3 and the data received from the preparation unit 76. The mesh deforming unit 78 carries out an appropriate deforming process if the meshes need to be deformed, based on the analyzed results of the growth analyzer 77. The after-processing unit 79 carries out the above described process s) with respect to the data output from the preparation unit 76 and obtained via the growth analyzer 77 and the mesh deforming unit 78. The mesh processor 89 carries out a meshing process based on the processed results of the after-processing unit 79, where the meshing process includes operations such as detecting overlapping portions of the meshes after the deformation, deletion and re-meshing. The mesh processor 80 stores the results of the meshing process into the analyzed data storage 74.

The analyzed data storage 74 may be the storage unit 4 shown in FIG. 4. In this case, the above described processes a) through s) are carried out with respect to the finite element mesh data stored in the storage unit 4, that is, with respect to the triangular mesh data.

One or a combination of the preparation unit 76, the growth analyzer 77, the mesh deforming unit 78, the after-processing unit 79 and the mesh processor 80 can be formed by hardware which is made up of a known processor and memory combination (that is, a computer), so that the above described processes can be realized by software by executing programs stored in the memory by the processor.

Further, the triangular mesh data which are generated and the analyzed data stored in the analyzed data storage 74 are displayed on a display portion of the input unit 81-3.

Figure 51:
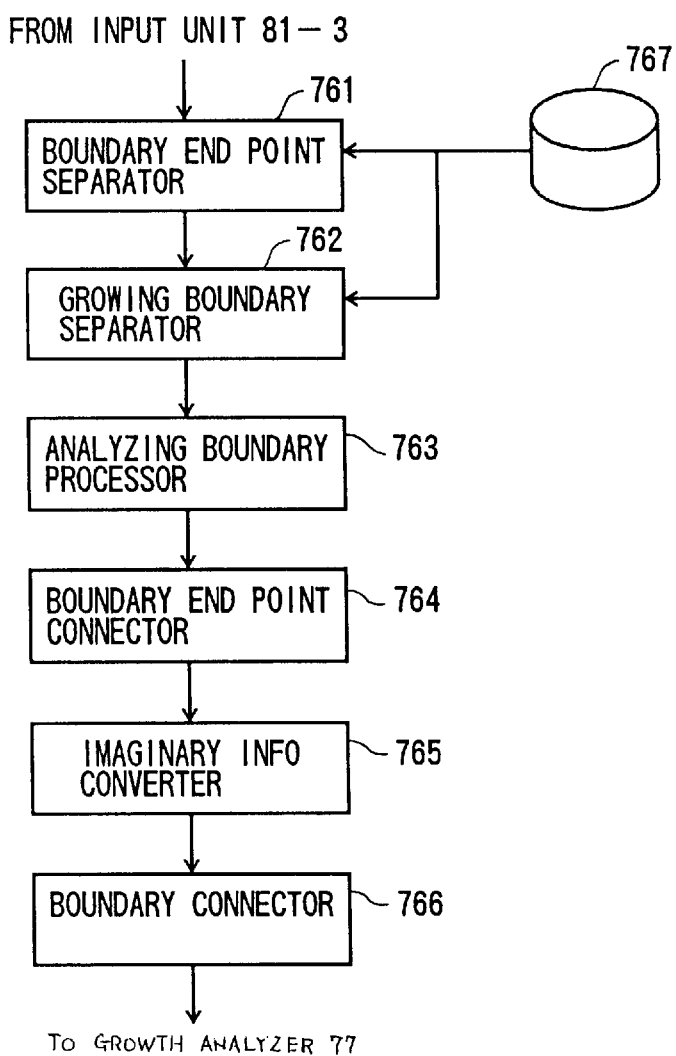
FIG. 51 is a system block diagram showing the construction of a preparation processor shown in FIG. 50.

FIG. 51 is a system block diagram showing the construction of the preparation unit 76 shown in FIG. 50. FIG. 51, the preparation unit 76 generally includes a boundary end point separator 761, a growing boundary separator 762, an analyzing boundary processor 763, a boundary end point connector 764, an imaginary information converter 765, a boundary connector 766 and a table data storage 767 which are connected as shown. The boundary end point separator 761 carries out at least one of the above described processes d), e), f), g), h), i), j), k), m), o) and q). The above described tables used during such processes are stored in the table data storage 767. The growing boundary processor 762 carries out at least one of the above described processes b), c) and n). The analyzing boundary processor 763 carries out the above described process d). The boundary end point connector 764 carries out at least one of the above described processes e), f), g), h), i), j), k), 1), m), p) and q). The imaginary information converter 765 carries out the above described process q), and the boundary connector 766 carries out the above described process r).

Further, the present invention is not limited to these embodiments, but various variations and modifications may be made without departing from the scope of the present invention.

What is claimed is:

1. A finite element mesh generating method which is implemented on a computer and generates triangular meshes used in finite element method analysis, said finite element mesh generating method comprising the steps of:

(a) inputting orthogonal meshes used in finite difference method and mesh joining conditions;

(b) setting flags indicating candidates of lattice points which are to be deleted out of lattice points of the orthogonal meshes, based on the orthogonal meshes;

(c) reducing a number of meshes by joining the lattice points having the set flag and lattice points adjacent thereto, based on the mesh joining conditions; and (d) successively generating triangular meshes by searching nodes formed by lattice points remaining on the meshes after joining the lattice points and generating oblique sides of rectangles which are formed by connecting said nodes.

2. The finite element mesh generating method as claimed in claim 1, wherein said step (b) judges as the candidates of the lattice points which are to be deleted only those lattice points satisfying predetermined conditions.

3. The finite element mesh generating method as claimed in claim 2, which further comprises the steps of:

(e) when a section having flags which are continuously set exists, equally dividing said section with a certain width so as to obtain a new node.

4. The finite element mesh generating method as claimed in claim 3, which further comprises the steps of:

(f) moving said new node to a closest adjacent lattice point on the orthogonal meshes.

5. The finite element mesh generating method as claimed in claim 4, which further comprises the steps of:

(g) prior to said step (d), moving or adding a node so that no obtuse angled triangle is generated if an obtuse angled triangle is formed when the nodes are connected.

6. The finite element mesh generating method as claimed in claim 4, wherein said step (f) obtains a new node by re-dividing the lattice points and the orthogonal meshes equally with a certain width.

7. The finite element mesh generating method as claimed in claim 6, which further comprises the steps of:

(h) prior to said step (d), obtaining a new node by re-dividing a region in which an obtuse angled triangle is detected equally with a certain width so that no obtuse angled triangle is generated if the obtuse angled triangle is formed when the nodes are connected.

8. The finite element mesh generating method as claimed in claim 1, which further comprises the steps of:

(e) displaying the triangular meshes generated in said step (d).

9. The finite element mesh generating method as claimed in claim 1, which further comprises the steps of:

(d) adding, with respect to a portion where a growing material is introduced, dummy meshes corresponding to a thin film of the growing material having a thickness which is zero or an extremely small thickness compared to other analyzing portions prior to making an analyzing process with respect to the growing material using the triangular meshes.

10. A finite element mesh generating apparatus which is implemented on a computer and generates triangular meshes used in finite element apparatus analysis, said finite element mesh generating apparatus comprising:

means for inputting orthogonal meshes used in difference apparatus and mesh joining conditions;

setting means for setting flags indicating candidates of lattice points which are to be deleted out of lattice points of the orthogonal meshes, based on the orthogonal meshes;

means for reducing a number of meshes by joining the lattice points having the set flag and lattice points adjacent thereto, based on the mesh joining conditions; and generating means for successively generating triangular meshes by searching nodes formed by lattice points remaining on the meshes after joining the lattice points and generating oblique sides of rectangles which are formed by connecting said nodes.

11. The finite element mesh generating apparatus as claimed in claim 10, wherein said setting means judges as the candidates of the lattice points which are to be deleted only those lattice points satisfying predetermined conditions.

12. The finite element mesh generating apparatus as claimed in claim 11, which further comprises:

means for equally dividing a section with a certain width so as to obtain a new node when said section having flags which are continuously set exists.

13. The finite element mesh generating apparatus as claimed in claim 12, which further comprises:

moving means for moving said new node to a closest adjacent lattice point on the orthogonal meshes.

14. The finite element mesh generating apparatus as claimed in claim 13, which further comprises:

means for moving or adding a node so that no obtuse angled triangle is generated if an obtuse angled triangle is formed when the nodes are connected, prior to generating the triangular meshes by said generating means.

15. The finite element mesh generating apparatus as claimed in claim 13, wherein said moving means obtains a new node by re-dividing the lattice points and the orthogonal meshes equally with a certain width.

16. The finite element mesh generating apparatus as claimed in claim 15, which further comprises:

means for obtaining a new node by re-dividing a region in which an obtuse angled triangle is detected equally with a certain width so that no obtuse angled triangle is generated if the obtuse angled triangle is formed when the nodes are connected, prior to generating the triangular meshes by said generating means.

17. The finite element mesh generating apparatus as claimed in claim 10, which further comprises:

display means for displaying the triangular meshes generated by said generating means.

18. The finite element mesh generating method as claimed in claim 10, which further comprises:

means for adding, with respect to a portion where a growing material is introduced, dummy meshes corresponding to a thin film of the growing material having a thickness which is zero or an extremely small thickness compared to other analyzing portions prior to making an analyzing process with respect to the growing material using the triangular meshes.

19. An analyzing method which is implemented on a computer and analyzes moving boundaries and changing shapes by use of meshes corresponding to materials, said analyzing method comprising the steps of:

(a) generating meshes corresponding to a first material on which a second material is grown; and (b) adding, with respect to a portion where the second material is introduced, dummy meshes corresponding to a thin film of the second material having a thickness which is zero or an extremely small thickness compared to other analyzing portions prior to making an analyzing process with respect to the second material using the meshes.

20. The analyzing method as claimed in claim 19, wherein a portion of said meshes where the second material is introduced is a boundary of a surface of the first material and air, and said step (b) changes information related to the surface of the first material or the boundary to information related to the second material and registers information related to a surface of the dummy meshes as new boundary information after adding the dummy meshes.

21. The analyzing method as claimed in claim 19, wherein a portion of said meshes where the second material is introduced is a boundary between the first material and a third material, and said step (b) inserts and adds the dummy meshes between the first and third materials, changes information related to a boundary of a surface of the first material and the dummy meshes to information related to the second material, and registers information related to a surface of the dummy meshes as new boundary information.

22. The analyzing method as claimed in claim 20, wherein said step (b) registers a side of the dummy meshes touching an analyzing boundary which indicates an end of an analyzing range as new boundary information.

23. The analyzing method as claimed in claim 20, wherein said step (b) includes:

registering a side of the dummy meshes close to a non-growing portion as boundary information between air and the second material at a connecting portion where the second material grown on a surface of the first material and the non-growing portion where no second material is grown connect;

adding at least one triangular dummy mesh which touches a connecting portion of first and second dummy meshes respectively corresponding to the first and second materials and integrating mutually touching first and second dummy meshes, and registering a side of the triangular dummy mesh touching the surface of the first material as new boundary information at a connecting portion where the second material grown on the surface of the first material and a third material already grown on the surface of the first material connect, where the second material and the third material are the same; and registering one of mutually touching sides of the first and second dummy meshes respectively corresponding to the first and second materials as new boundary information at a connecting portion where the second material grown on the surface of the first material and a fourth material already grown on the surface of the first material touch, where the second and fourth materials are different.

24. The analyzing method as claimed in claim 21, wherein said step (b) includes:

adding at least one triangular dummy mesh touching a side at a boundary between the dummy meshes and meshes corresponding to a third material which is already grown, and registering a side of the triangular dummy mesh touching a fourth material as new boundary information at a connecting portion where the second material touches the third material in a boundary portion of the first material and the fourth material, where the second and third materials are the same and the first and fourth materials are different;

registering a side of the dummy meshes touching first and second surfaces as new boundary information when the second material touches the first surface of the first material and the second surface of the fourth material in the boundary portion between the first material and the fourth material; and adding at least one triangular dummy mesh touching a side at a boundary of the dummy meshes and the meshes corresponding to a fifth material which is already grown and registering a side touching a mesh corresponding to the fifth material as new boundary information at a connecting portion where the second material touches the fifth material which is already grown in the boundary portion between the first material and the fourth material, where the second and fifth materials are different.

25. The analyzing method as claimed in claim 19, which further comprises the steps of:

(c) treating air and analyzing boundaries as materials, and processing meshes corresponding to each of the materials using a table which specifies a material grown on a material boundary by materials on both sides of the material boundary.

26. The analyzing method as claimed in claim 19, which further comprises the steps of:

(c) detecting continuous boundaries and integrating the same; and (d) detecting and deleting meshes which become unnecessary after an analyzing process due to integration in said step (c).

27. An analyzing apparatus which is implemented on a computer and analyzes moving boundaries and changing shapes by use of meshes corresponding to materials, said analyzing apparatus comprising:

first means for generating meshes corresponding to a first material on which a second material is grown;

storage means for storing the meshes; and second means for adding, with respect to a portion where the second material is introduced, dummy meshes corresponding to a thin film of the second material having a thickness which is zero or an extremely small thickness compared to other analyzing portions prior to making an analyzing process with respect to the second material using the meshes.

28. The analyzing apparatus as claimed in claim 27, wherein a portion of said meshes where the second material is introduced is a boundary of a surface of the first material and air, and said second means changes information related to the surface of the first material or the boundary to information related to the second material and registers information related to a surface of the dummy meshes as new boundary information after adding the dummy meshes.

29. The analyzing apparatus as claimed in claim 27, wherein a portion of said meshes where the second material is introduced is a boundary between the first material and a third material, and said second means inserts and adds the dummy meshes between the first and third materials, changes information related to a boundary of a surface of the first material and the dummy meshes to information related to the second material, and registers information related to a surface of the dummy meshes as new boundary information.

30. The analyzing apparatus as claimed in claim 28, wherein said second means registers a side of the dummy meshes touching an analyzing boundary which indicates an end of an analyzing range as new boundary information.

31. The analyzing apparatus as claimed in claim 28, wherein said second means comprises:

means for registering a side of the dummy meshes close to a non-growing portion as boundary information between air and the second material at a connecting portion where the second material grown on a surface of the first material and the non-growing portion where no second material is grown connect;

means for adding at least one triangular dummy mesh which touches a connecting portion of first and second dummy meshes respectively corresponding to the first and second materials and integrating mutually touching first and second dummy meshes, and registering a side of the triangular dummy mesh touching the surface of the first material as new boundary information at a connecting portion where the second material grown on the surface of the first material and a third material already grown on the surface of the first material connect, where the second material and the third material are the same; and means for registering one of mutually touching sides of the first and second dummy meshes respectively corresponding to the first and second materials as new boundary information at a connecting portion where the second material grown on the surface of the first material and a fourth material already grown on the surface of the first material touch, where the second and fourth materials are different.

32. The analyzing apparatus as claimed in claim 29, wherein said second means comprises:

means for adding at least one triangular dummy mesh touching a side at a boundary between the dummy meshes and meshes corresponding to a third material which is already grown, and registering a side of the triangular dummy mesh touching a fourth material as new boundary information at a connecting portion where the second material touches the third material in a boundary portion of the first material and the fourth material, where the second and third materials are the same and the first and fourth materials are different;

means for registering a side of the dummy meshes touching first and second surfaces as new boundary information when the second material touches the first surface of the first material and the second surface of the fourth material in the boundary portion between the first material and the fourth material; and means for adding at least one triangular dummy mesh touching a side at a boundary of the dummy meshes and the meshes corresponding to a fifth material which is already grown and registering a side touching a mesh corresponding to the fifth material as new boundary information at a connecting portion where the second material touches the fifth material which is already grown in the boundary portion between the first material and the fourth material, where the second and fifth materials are different.

33. The analyzing apparatus as claimed in claim 27, which further comprises:

means for treating air and analyzing boundaries as materials, and processing meshes corresponding to each of the materials using a table which specifies a material grown on a material boundary by materials on both sides of the material boundary.

34. The analyzing apparatus as claimed in claim 27, which further comprises:

third means for detecting continuous boundaries and integrating the same; and fourth means for detecting and deleting meshes hich become unnecessary after an analyzing process ue to integration in said third means.

35. A finite element semiconductor device production process mesh generating method which is implemented on a computer and generates triangular meshes used in finite element method analysis, said finite element mesh generating method comprising the steps of:

(a) inputting orthogonal meshes of semiconductor device production processes used in finite difference method and mesh joining conditions;

(b) setting flags indicating candidates of lattice points which are to be deleted out of lattice points of the orthogonal meshes, based on the orthogonal meshes;

(c) reducing a number of meshes by joining the lattice points having the set flag and lattice points adjacent thereto, based on the mesh joining conditions; and (d) successively generating triangular meshes of the semiconductor device production processes by searching nodes formed by lattice points remaining on the meshes after joining the lattice points and generating oblique sides of rectangles which are formed by connecting said nodes.

36. A finite element mesh semiconductor device production mesh generating apparatus which is implemented on a computer and generates triangular meshes used in finite element apparatus analysis, said finite element mesh generating apparatus comprising:

means for inputting orthogonal meshes of semiconductor device production processes used in difference apparatus and mesh joining conditions;

setting means for setting flags indicating candidates of lattice points which are to be deleted out of lattice points of the orthogonal meshes, based on the orthogonal meshes;

means for reducing a number of meshes by joining the lattice points having the set flag and lattice points adjacent thereto, based on the mesh joining conditions; and generating means for successively generating triangular meshes of the semiconductor device production processes by searching nodes formed by lattice points remaining on the meshes after joining the lattice points and generating oblique sides of rectangles which are formed by connecting said nodes.

37. An analyzing method which is implemented on a computer and analyzes moving boundaries and changing shapes by use of meshes corresponding to materials of semiconductor device production processes, said analyzing method comprising the steps of:

(a) generating semiconductor device production process meshes corresponding to a first material on which a second material is grown; and (b) adding, with respect to a portion where the second material is introduced, dummy meshes corresponding to a thin film of the second material having a thickness which is zero or an extremely small thickness compared to other analyzing portions prior to making an analyzing process with respect to the second material using the meshes.

38. An analyzing apparatus which is implemented on a computer and analyzes moving boundaries and changing shapes by use of meshes corresponding to materials of semiconductor device production processes, said analyzing apparatus comprising:

first means for generating semiconductor device production process meshes corresponding to a first material on which a second material is grown;

storage means for storing the meshes; and second means for adding, with respect to a portion where the second material is introduced, dummy meshes corresponding to a thin film of the second material having a thickness which is zero or an extremely small thickness compared to other analyzing portions prior to making an analyzing process with respect to the second material using the meshes.

39. A computer readable media having encoded thereon a finite element semiconductor device production process mesh generating method which is implemented on a computer and generates triangular meshes used in finite element method analysis, said finite element mesh generating method comprising the steps of:

(a) inputting orthogonal meshes of semiconductor device production processes used in finite difference method and mesh joining conditions;

(b) setting flags indicating candidates of lattice points which are to be deleted out of lattice points of the orthogonal meshes, based on the orthogonal meshes;

(c) reducing a number of meshes by joining the lattice points having the set flag and lattice points adjacent thereto, based on the mesh joining conditions; and (d) successively generating triangular meshes of the semiconductor device production processes by searching nodes formed by lattice points remaining on the meshes after joining the lattice points and generating oblique sides of rectangles which are formed by connecting said nodes.

* * * * *

UNITED STATES PATENT AND TRADEMARK OFFICE
CERTIFICATE OF CORRECTION

PATENT NO.: 5,838,594
DATED : November 17, 1998
INVENTOR(S): Shuichi KOJIMA

It is certified that error appears in the above-identified patent and that said Letters Patent is hereby corrected as shown below:

Col. 31, line 1, change "hich" to --which--;
line 2, change "ue" to --due--.

Signed and Sealed this

Fourth Day of May, 1999

Q. TODD DICKINSON

Attest:

Attesting Officer

Acting Commissioner of Patents and Trademarks